United States Patent [19]

Sakakibara

[11] Patent Number: 5,215,874

[45] Date of Patent: Jun. 1, 1993

[54] SILVER HALIDE PHOTOGRAPHIC MATERIAL HAVING MAGNETIC RECORDING MEMBER

[75] Inventor: Yoshio Sakakibara, Kanagawa, Japan

[73] Assignee: Fuji Photo Film Co., Ltd., Kanagawa, Japan

[21] Appl. No.: 822,980

[22] Filed: Jan. 21, 1992

[30] Foreign Application Priority Data

Jan. 21, 1991 [JP] Japan .................................. 3-207113
Jan. 21, 1991 [JP] Japan .................................. 3-207120

[51] Int. Cl.$^5$ .......................... G03C 1/76; G03C 3/00; G11B 5/633
[52] U.S. Cl. ................................... 430/496; 430/501; 428/692; 428/694 B
[58] Field of Search ....................... 430/140, 496, 501; 428/692, 693, 694

[56] References Cited

U.S. PATENT DOCUMENTS

| | | | |
|---|---|---|---|
| 4,279,945 | 7/1981 | Audran et al. ................ | 430/140 |
| 4,832,275 | 5/1989 | Robertson ..................... | 242/71.1 |
| 4,834,306 | 5/1989 | Robertson et al. ............ | 242/71.1 |
| 4,846,418 | 7/1989 | Fairman ....................... | 242/71.1 |
| 5,047,278 | 9/1991 | Ono et al. ..................... | 428/694 |

Primary Examiner—Charles L. Bowers, Jr.
Assistant Examiner—Mark F. Huff
Attorney, Agent, or Firm—Sughrue, Mion, Zinn, Macpeak & Seas

[57] ABSTRACT

A silver halide photographic material comprises a transparent support, at least one silver halide emulsion layer, and a magnetic recording film. The support and magnetic recording film are prepared by coextrusion of a polyester material containing no ferromagnetic powder and a polyester material containing a ferromagnetic powder. At least one polyester material preferably has a hydrophilic group in its structure or contains a hygroscopic material. Further, the above silver halide photographic material enclosed with a cylindrical cartridge and a magnetic recording sheet consisting of a polyester material and a polyester material with a hydrophilic group in its structure containing a ferromagnetic powder, are disclosed.

24 Claims, 8 Drawing Sheets

SILVER HALIDE PHOTOGRAPHIC MATERIAL HAVING MAGNETIC RECORDING MEMBER

FIELD OF THE INVENTION

The present invention relates to a silver halide photographic material having magnetic recording member and further relates to a magnetic recording element.

BACKGROUND OF THE INVENTION

A silver halide photographic material (hereinafter referred to as a photographic film) has a basic structure comprising a silver halide emulsion layer provided on a support. In order to record information other than image in photography or printing, a conventional silver halide photographic material is provided with one or more magnetic recording layer in the form of a long stripe on an area other than the photographic image area of the material. However, the stripe part brings about occurrence of flex unevenness in the photographic film, or a deterioration of photographic characteristics caused by air trapped on a portion between the stripe parts.

U.S. Pat. Nos. 3,782,947 and 4,279,945 disclose a photographic film provided with a transparent magnetic recording layer on an image area. In the case of providing the magnetic recording layer to the image area, it is required to minimize a content of a ferromagnetic powder to prevent lowering of photographic sensitivity caused by adsorption of light by the ferromagnetic powder. Naturally, reduction of the content of the ferromagnetic powder decreases magnetic recording or reproducing characteristics. Accordingly, it is desired that the disadvantageous feature caused by the reduction of the amount of the ferromagnetic powder minimized.

In such photographic films with a magnetic recording layer, information is recorded and reproduced using a magnetic head. To increase the amount of information, track number of the magnetic head is generally designed to increase, while the increase of the track number generally makes one track to have a very narrow track width. If the dimension of the film is greatly apt to vary with change of temperatures or humidity, the recording location and the reproducing location are sometimes deviated to give error. Accordingly, it is desired that a support of the photographic film shows an excellent dimensional stability.

Further, in the case that a long continuous photographic film is incorporated into a cylindrical cartridge having certain dimension, or a continuous photographic film having a certain length is incorporated into a compact cylindrical cartridge, it is preferable that a thickness of a support of the film is as thin as possible. However, the thin support is apt to show a low mechanical strength (e.g., braking, bending), so that the support of such photographic film is preferably improved in its mechanical strength.

Cellulose triacetate, which is a conventional support material of a photographic film, does not satisfy characteristics such as an excellent dimensional stability and a high mechanical strength. The most adequate material satisfying the above characteristics, is polyester from the viewpoint of transparency and production cost. The abovementioned U.S. Pat. Nos. 3,782,947 and 4,279,945 disclose use of polyester as material of the support.

In more detail, photographic materials of the above patents are obtained by forming a magnetic recording layer comprising a magnetic powder and a binder of polyvinyl chloride and the like (i.e., polymer except polyester) on a polyester support. However, the recording layer does not sufficiently adhere to the support so that the recording layer sometimes separates from the support when it is run in contact with a magnetic head. Further, provision of the recording layer by a coating method using organic solvents brings about pollution of manufacturing environment due to the evaporated organic solvents. Furthermore, the use of a coating method is not advantageous from the viewpoint of productivity.

PCT International Publication No. WO91/11750 discloses a photographic film which is prepared by simultaneously casting a cellulose triacetate solution and a cellulose triacetate solution containing a ferromagnetic powder on a cast surface and evaporating a solvent from the solution. This process does not need a coating process and hence it is advantageous in terms of productivity. However, since cellulose triacetate is used as the film material, the obtained photographic film does not have satisfactory characteristics such as dimensional stability and mechanical strength.

SUMMARY OF THE INVENTION

It is an object of the present invention to provide a silver halide photographic material showing an excellent dimensional stability and a high mechanical strength.

It is another object of the invention to provide a silver halide photographic material having a magnetic recording layer which has a satisfactory high bonding strength between a support and a magnetic recording layer.

It is further an object of the invention to provide a silver halide photographic material having a magnetic recording layer which shows little magnetic output error.

It is still further an object of the invention to provide a silver halide photographic material which is almost free from keeping curling tendency when it is enclosed with a cylindrical cartridge of a small sized diameter, even if the photographic film is thin.

It is still further an object of the invention to provide a magnetic recording layer showing an improved magnetic recording or reproducing characteristics.

There is provided by the present invention a silver halide photographic material comprising a transparent support, at least one silver halide emulsion layer, and a magnetic recording film, wherein said support and magnetic recording film are prepared by coextrusion of a polyester material containing no ferromagnetic powder and a polyester material containing a ferromagnetic powder.

There is further provided by the invention a silver halide photographic material enclosed with a cylindrical cartridge, said silver halide photographic material comprising a transparent support, at least one silver halide emulsion layer and a magnetic recording film, and said cylindrical cartridge having a spool for winding the photographic material therearound (specifically further having a film feeding means), wherein said support and magnetic recording film are prepared by coextrusion of a polyester material containing no ferromagnetic powder and a polyester material containing a ferromagnetic powder.

There is furthermore provided by the invention a magnetic recording sheet comprising a support and a magnetic recording layer, wherein said support and magnetic recording film are prepared by coextrusion of a polyester material containing no ferromagnetic powder and a polyester material containing a ferromagnetic powder, the latter polyester material having a hydrophilic group in its structure.

The silver halide photographic material (in the form of film) having a magnetic recording layer of the invention has a high mechanical strength and a high bonding strength between a support and a magnetic recording layer. Therefore, the photographic film shows little magnetic output error during recording or reproducing procedure. Further, in the case that the photographic material is incorporated into a cylindrical cartridge (specifically having a film-feeding means), the film is reduced in its curling tendency even if the film is thin. It is understood that this favorable effect is given because the film has excellent mechanical strength (and further increased hygroscopicity).

The silver halide photographic material of the invention does not cause pollution of manufacturing environment in the continuous process.

The magnetic recording sheet of the present invention is in the form of a composite film of polyester material, and shows an improved magnetic recording or reproducing characteristics, because the sheet has high mechanical strength and increased hygroscopicity and a ferromagnetic powder is homogeneously dispersed in the presence of hydrophilic groups attached to a molecule of the polyester material.

DETAILED DESCRIPTION OF THE INVENTION

The silver halide photographic material according to the present invention comprises a transparent polyester support, at least one silver halide emulsion layer, and a magnetic recording polyester film. Representative structures are shown in FIGS. 1 and 2.

Figure 1:
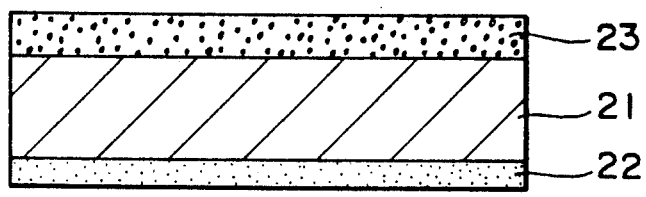
FIG. 1 is a sectional view of an example of the silver halide photographic material according to the invention.

In FIG. 1, on a support 21 is arranged a magnetic recording film 22, and a silver halide emulsion layer 23 is formed on the opposite surface of the support 21.

Figure 2:
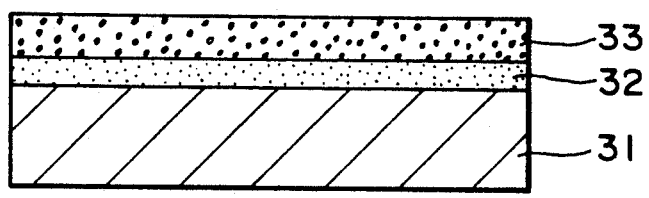
FIG. 2 is a sectional view of another example of the silver halide photographic material according to the invention.

In FIG. 2, on a support 31 is arranged a magnetic recording film 32, and a silver halide emulsion layer 33 is formed on the magnetic recording film 32.

The invention preferably adopts the structure as shown in FIG. 1. The support and the magnetic recording film are prepared simultaneously by coextrusion of a polyester material containing no ferromagnetic powder and a polyester material containing a ferromagnetic powder. Therefore, both the support and the magnetic recording film of the invention are made of polyester material.

In the invention, at least one of the polyester materials constituting the support and the magnetic recording film preferably has a hydrophilic group in its molecular structure. More preferably each of the polyester materials has a hydrophilic group.

Otherwise, at least one of the support and the magnetic recording film preferably contains a hygroscopic material. In more detail, the support or the magnetic recording film can be prepared by adding the hygroscopic material into polyester material. More preferably each of the support and the magnetic recording film contains a hygroscopic material.

The polyester material of the invention is described below in more detail. The polyester material employed in the invention preferably is one derived mainly from a dibasic acid and glycol.

For instance poly(ethylene terephthalate), namely PET, is known well. Polyester having a hydrophilic group of the invention is capable of keeping a higher moisture content compared with the PET.

The hydrophilic group preferably is a hydroxyl group, an alkyleneoxide group or an ionic group. Preferred examples of the alkyleneoxide group include a (poly)ethyleneoxy group and a (poly)propyleneoxy group. Preferred examples of the ionic group include a carboxylic acid group, a group derived from carboxylic acid (e.g., its salt group), a sulfonic acid group, a group derived from sulfonic acid (e.g., its salt group), a sulfinic acid group, a group derived from sulfinic acid (e.g., its salt group), a sulfuric acid group, a group derived from sulfuric acid (e.g., its salt group), a phosphoric acid group, a group derived from phosphoric acid (e.g., its salt group).

The hydrophilic group may be introduced into either the dibasic acid or glycol.

Preferred examples of the dibasic acid having a hydrophilic group include 5-sodiumsulfoisophthalic acid, 2-sodiumsulfoterephthalic acid, 4-sodiumsulfophthalic acid, 4-sodiumsulfo-2,6-naphthalenedicarboxylic acid, 1,3,5-benzenetricarboxylic acid monosodium salt,

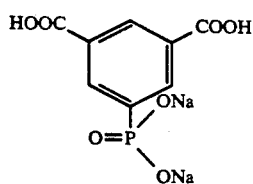
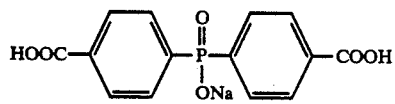
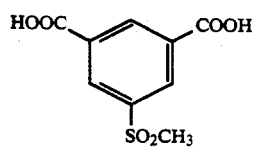
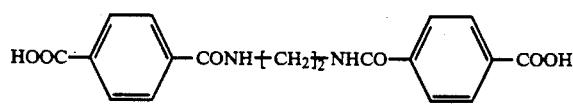
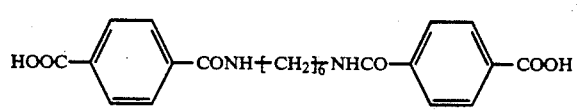
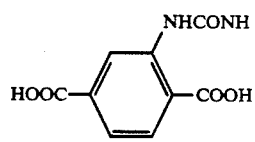
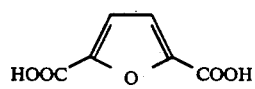
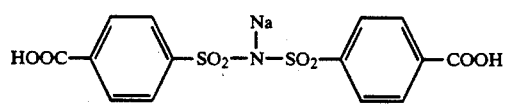
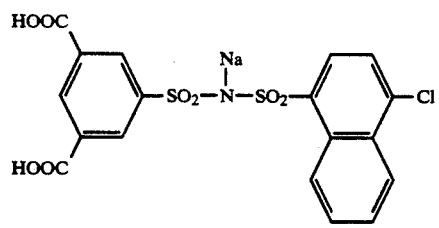
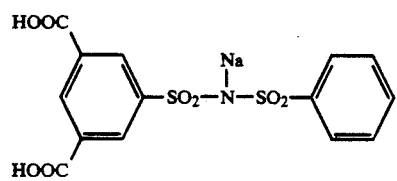
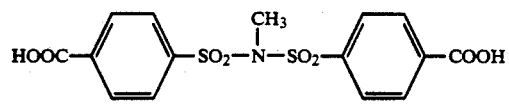

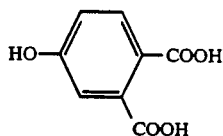

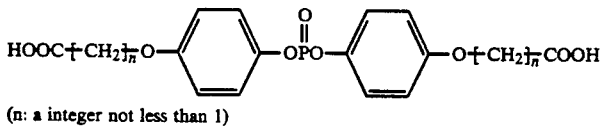

(n: a integer not less than 1)

The sodium salt of the above dibasic acids may be replaced with a hydrogen atom or metal atoms (e.g., Li, K). Further, the carboxy groups of the dibasic acids may be esterified (e.g., alkyl ester or aryl ester), or transformed into a form of acid chloride.

Preferred examples of the glycol having a hydrophilic group include HO—($CH_2$)—(O—$CH_2$—$CH_2$-)$_m$—O($CH_2$)$_2$—H (wherein m is an integer of 1 to 20), HO—(CH($CH_3$)—$CH_2$—O)$_m$-H (wherein m is an integer of 1 to about 20),

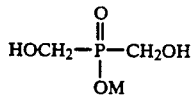

(M: alkaline atom shch as Li, Na and K, and H)

Further, examples of the glycol include hydroxy polyester (polyester having hydroxyl groups), hydroxy polyacet al (polyacetal having hydroxyl groups) and hydroxy ester amide (amide having hydroxyl groups and ester bonds). The polyester having hydroxyl groups is a reacted product of polyol (mainly glycol) and dibasic carboxylic acid. The polyacetal is obtained from glycol (e.g., diethylene glycol) and formaldehyde. The amide is, for example, a condensation product obtained from dibasic carboxylic acid and amino alcohol or a mixture of diamine and polyamine.

As materials of the polyester of the invention, the following compounds (including main component) other than the above-mentioned compounds can be employed.

Examples of dibasic acid includes terephthalic acid, isophthalic acid, phthalic acid, phthalic anhydride, succinic acid, glutaric acid, adipic acid, sebasic acid, succinic anhydride, maleic acid, fumaric acid, maleic anhydride, itaconic acid, citraconic anhydride, tetrahydrophthalic anhydride, diphenylene-p,p-dicarboxylic acid, terachlorophthalic anhydride, 3,6-endomethylenetetrahydrophthalic anhydride, 1,4-cyclohexanedicarboxylic acid,

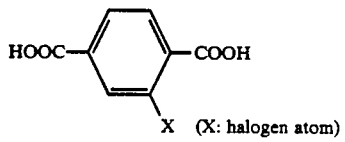

X   (X: halogen atom)

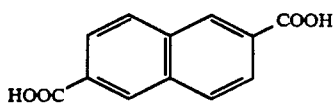

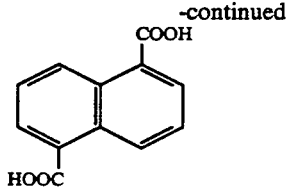

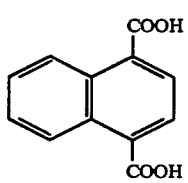

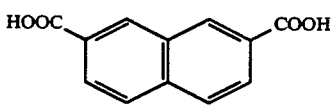

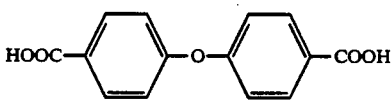

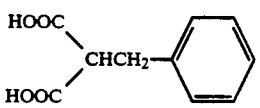

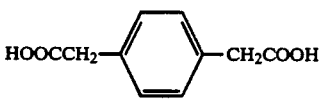

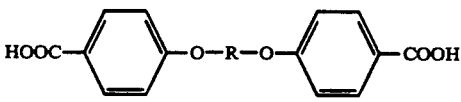

(R: an alkylene group having carbon atoms of 1 to 5)

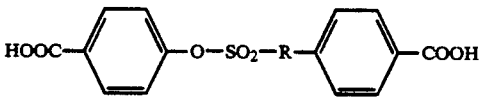

(R: an alkylene group having carbon atoms of 1 to 5)

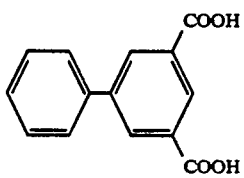

-continued

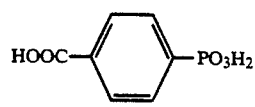

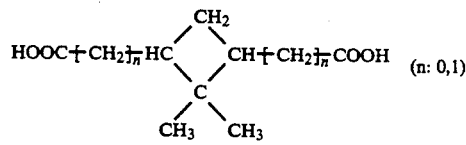 (n: 0,1)

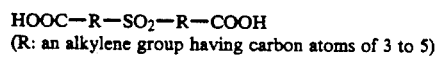
(R: an alkylene group having carbon atoms of 3 to 5)

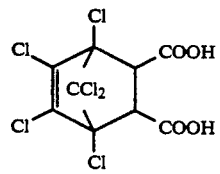

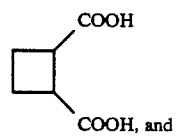

Examples of glycol employable for the polyester include ethylene glycol, 1,3-propanedio, 1,2-propanediol, 1,4-butanediol, 1,5-pentandiol, 1,6-hexanediol, 1,7-heptanediol, 1,8-octanediol, 1,10-decandiol, 1,12-dodecanediol, 1,4-cyclohexanediol, 1,4-cyclohexanedimethanol, 1,3-dicyclohexanediol, 1,1-cyclohexanedimethanol, catecol, resorcine, hydroquinone, 1,4-benzenedimethanol,

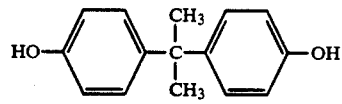

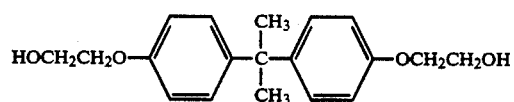

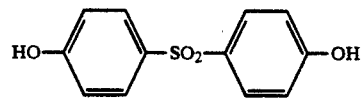

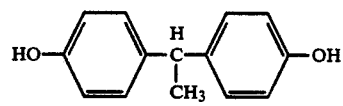

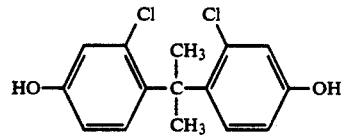

-continued

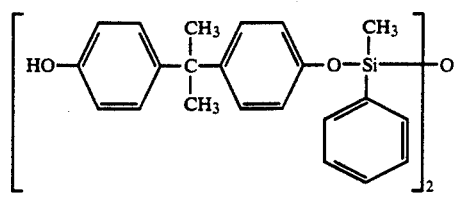

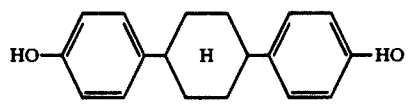

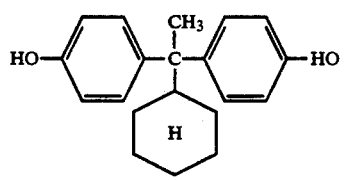

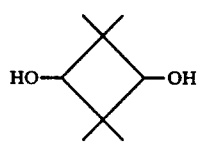

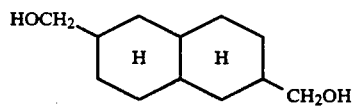

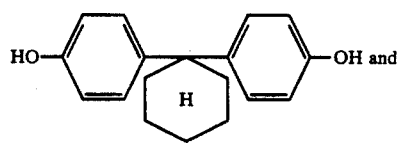

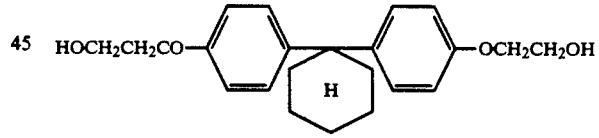

In the invention, mono-functional or three or more functional compounds (compounds having hydroxyl groups or having carboxyl groups) may be employed, if desired.

Further, a compound having both a hydroxyl group and a carboxyl group (or its ester group) may be employed. Examples of such compound are as follows;

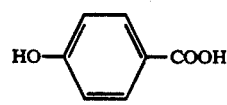

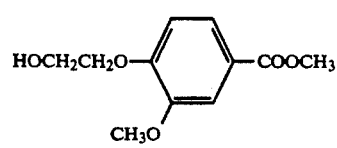

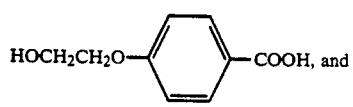

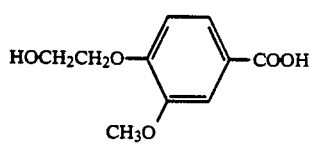

The polyester having a hydrophilic group preferably has the following formulas (I) and (II):

$$OH-R^1-OH \quad (I)$$

wherein $R^1$ represents a linear or branched alkylene group or alkenylene group having carbon atoms of 2 to 30, $$HOOC-Ar^1-COOH \quad (II)$$

wherein $Ar^1$ represents a benzene ring or naphthalene ring which may have a substituent group, and at least one of the following formulas (III) and (IV):

$$OH-R^2-OH \quad (III)$$

wherein $R^2$ represents a (poly)ethyleneoxy group or a (poly)propyleneoxy group which may have a substituent group, $$HOOC-Ar^2-COOH \quad (IV)$$
$$\quad\quad\quad | \quad\quad\quad$$
$$\quad\quad\quad X^2 \quad\quad\quad$$

wherein $Ar^2$ represents a benzene ring or naphthalene ring which may have a substituent group, and $X^1$ represents a carboxy group, its salt, a sulfo group, its salt, a sulfino group, its salt, a phosphoric acid group, its salt or a hydroxyl group.

The polyester of the invention is preferably a copolycondensation polyester obtained from ethylene glycol and terephthalic acid. A component of the above-mentioned compound having a hydrophilic group, which is incorporated into such polyester, is preferably contained in the polyester in the range of 1 to 50 weight % based on the polyester, more preferably in the range of 2 to 40 weight %, although the amount is variable with the extent of the hydrophilic property of the polyester itself or physical properties (refractive index, mechanical strength, etc.) of the polyester. A total amount of the above. mentioned ethylene glycol and terephthalic acid is preferably contained in the polyester in the range of 10 to 90 weight % based on the whole polyester, more preferably in the range of 20 to 80 weight %. A amount of compounds except the above-mentioned ethylene glycol, terephthalic acid and compound having a hydrophilic group is preferably contained in the polyester in the range of 0 to 50 weight % based on the whole polyester, more preferably 0 to 40 weight %.

The polyester of the invention can be synthesized by a conventional method. For example, the synthesis is conducted by direct esterification of dibasic acid and glycol, by ester interchange of dialkylester of dibasic acid and glycol, or by reaction of basic halide (instead of dibasic acid) with glycol. In the synthesis, further ester interchange may be carried out, or a catalyst, an initiator and a thermal stabilizer may be added.

The polyester can be prepared in accordance with a known method, for example, described in "Polycondensation and Polyaddition", vol. 5 of Polymer Experimental Study, (KYORITSU SYUPPAN, 1980), pp. 103-136; or "Synthetic Polymer V", (ASAKURA SYOTEN, 1971), pp. 187-286.

An average molecular weight of the polyester employed in the invention preferably is in the range of about 3,000 to about 100,000. Preferred examples of the polyester according to the invention are as follows:

P-1 TPA/AA/SSIA/EG (88/5.3/6.7/100)
P-2 TPA/AA/SSIA/EG (90/7.2/2.8/100)
P-3 TPA/AA/SSIA/EG (88/7.2/4.8/100)
P-4 TPA/SSIA/EG/DEG (95/5/85/15)
P-5 TPA/SSIA/EG/DEG (93/7/80/20)
P-6 TPA/AA/SPIA/EG (90/4/6/100)
P-7 TPA/PEG(4000)/EG (100/0.5/99.5)
P-8 TPA/IPA/SSIA/PEG(4000)/EG (95/4/1/0.3/99.7)
P-9 TPA/SSIA/SA/TEEG/EG (95/3/2/5/95)
P-10 TPA/SCPP/AA/EG (90/5/5/100)
P-11 TPA/AA/SSIA/EG/DEG (88/5/7/90/10)
P-12 TPA/PISB/AA/EG (94/3/3/100)
P-13 TPA/PISB/AA/DEG (97/3/95/5)
P-14 TPA/EG/DMPS (100/95/5)
P-15 TPA/SSIA/SA/EG/BHPP (90/2/8/95/5)

The value within ( ) means a molar ratio of components (compounds) constituting each polyester. The abbreviations of the components (dibasic acids or glycols) mean the following compounds.

 TPA

HOOC⁃(CH₂)₄⁃COOH  AA

 SSIA

HOCH₂CH₂OH  EG

HO⁃(CH₂CH₂O)₂⁃H  DEG

HO⁃(CH₂CH₂O)₃⁃H  TEG

 SPIA

HO⁃(CH₂CH₂O)ₙ⁃H  PFG(4000)
(Molecular weight: 4,000)

 IPA

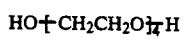 SA

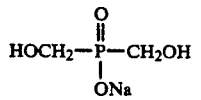 TEEG

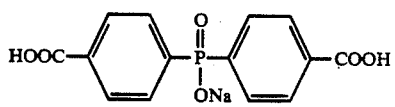 SCPP

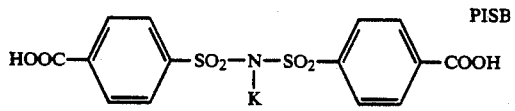 PISB

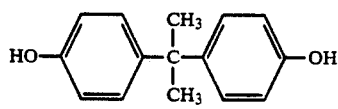 DMPS

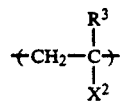 BHPP

In the above-mentioned molar ratio, the ratio of the dibasic component means a molar ratio based on the charged amounts of the component compounds. The ratio of the glycol component other than EG means a molar percentage per the total amount of the dibasic components. A molar ratio of EG component is represented by a difference between 100 and the molar percentage of the glycol component, although EG is used in excess in accordance with an ordinary method for ester interchange.

Subsequently, a hydroscopic material incorporatable into polyester (preferably poly(ethylene terephthalate)) according to the invention is described below.

Examples of the hygroscopic material include a polymer having at least one group which is selected from those consisting of a sulfonic acid group, a group derived from sulfonic acid, a sulfinic group, a group derived from sulfinic acid, a phosphonic acid group, a group derived from phosphonic acid, a carboxyl group, a group derived from carboxylic acid, a polyalkyleneoxy group, an alkoxy group, an alkoxycarbonyl group, a sulfamoyl group, a carbamoyl group, an acylamino group, a sulfoamide group, a disulfoamide group, an ureido group, an urethane group, an alkylsulfonyl group and an alkoxysulfonyl group; and oxides, sulfides, sulfates, sulfites, carbonates, hydroxides, halides and nitrates of alkali metals, those of alkaline earth metals, those of Si, those of Al, those of Zr, those of Fe, those of Sb, those of Sb and those of Pb. The materials may be employed singly or in combination.

The hygroscopic material is preferably a polymer having the following recurring unit (V) or (VI):

$$+CH_2-\underset{\underset{X^2}{|}}{\overset{\overset{R^3}{|}}{C}}+ \quad (V)$$

wherein $R^3$ represents hydrogen atom, methyl group or a 3 halogen atom (Cl, Br or I), $X^2$ represents —COOM, —SO$_3$M, —OPO$_3$M, —OSO$_3$M, —(CH$_2$CH$_2$O)—H, —Ph—SO$_3$M or CONH$_2$, in which M represents hydrogen atom, an alkali metal (Na, K or Li) or an alkaline earth metal (Ca or Mg).

$$H-(CH_{2n}-CH_2-O)_m-H \quad (VI)$$

wherein m represents an integer of 1 to 20.

Preferable examples of the polymer with hygroscopic property include polyacrylic acid, its derivatives, polymethacrylic acid, its derivatives, polyacrylamide, its derivatives, polyethylene oxide, its derivatives (polyethylene glycol, its derivatives), polystyrenesulfonate or its derivatives.

The polymer with hygroscopic property is blended with polyester (preferably poly(ethylene phthalate)) to form a film by means of extrusion. A blended ratio of the polymer and polyester is preferably in the range of 80:20 to 5:95 (the polymer: polyester), more preferably in the range of 70:30 to 20:80, by weight %. The amount of polyester more than the above range renders a hygroscopic property of a support insufficient, while the less amount than the above range reduces heat-resistance of the support. The polymer having hygroscopic property may be compatible with PET, and further the polymer may be under phase separation with PET as long as having transparency. A compatible accelerator may be further added for the purpose of improvement of the compatibility.

Preferable examples of the inorganic compound having hygroscopic property include silica, alumina, calcium carbonate, magnesium carbonate, kaolin, clay, talc and titanium dioxide. The compound may be added directly to polyester. Alternatively, the compound subjected to surface treatment (e.g., addition of high fatty acid, treatment of silan coupling agent) may be added for the purpose of improvement of compatibility with the polyester. The addition amount of the compound is preferably in the range of 0.1 to 30 weight %, more preferably 0.2 to 20 weight %. The less amount than the above range does not bring about enhancement of hygroscopic property, while the more amount than the above range is apt to cause haze. The addition of the inorganic compound may be conducted during or after the synthesis of polyester. Further, the inorganic compound may be added to a reaction mixture in the form of its precursor at the beginning of the synthesis, to obtain the desired compound.

The magnetic recording film (polyester film containing a ferromagnetic powder) according to the invention preferably comprises either polyester having a hydrophilic group or polyester (preferably poly(ethylene terephthalate)) containing a hygroscopic material. The magnetic recording film may have one or plural magnetic recording layers.

As a ferromagnetic powder empolyable in the invention, there can be mentioned a ferromagnetic iron oxide powder such as γ-Fe$_2$O$_3$, a ferromagnetic iron oxide powder containing Co, a ferromagnetic metal powder, a ferromagnetic alloy powder, a ferromagnetic chromium dioxide powder and barium ferrite.

As a ferromagnetic iron oxide powder, there can be mentioned Δ-Fe$_2$O$_3$ a and Fe$_3$O$_4$ γ-FeO$_x$ (x=1.33 1.50).

As a ferromagnetic metal powder, there can be mentioned a ferromagnetic metal or alloy powder containing a metal component of at least 75 weight % in which at least 80 weight % of the metal component comprises at least one ferromagnetic metal or metal alloy (e.g., Fe, Co, Ni, Fe-Co, Fe-Ni, Co-Ni or Co-Fe-Ni) and the remaining metal component, if present, comprises other atom(s) (e.g., Al, Si, S, Se, Ti, V, Cr, Mn, Cu, Zn, Y, Mo, Rh, Pd, Ag, Sn, Sb, B, Ba, Ta, W, Re, Au, Hg, Pb, P, La, Ce, Pr, Nd, Te or Bi). The ferromagnetic metal powder may contain a small amount of water, hydroxide, or oxide.

Processes for the preparation of ferromagnetic powders are already known, and the ferromagnetic powder employed in the invention can be prepared by the known processes.

There is no specific limitation with respect to the shape of the ferromagnetic powder employable in the invention, but generally used is a ferromagnetic powder in a needle shape, a grain shape, a spherical shape, a dice shape, a cubic shape, a rice shape and a plate shape. Preferably employed is a ferromagnetic powder in a needle shape or a plate shape. The ferromagnetic powder of a needle shape preferably has a mean particle size of 0.04 to 3.0 $\mu$m and a ratio of particle diameters (long diameter/short diameter, aspect ratio) of 3 to 15. The barium ferrite of a plate shape preferably has a mean particle size of 0.04 to 3.0 $\mu$m and a thickness in the range of 1/2 to 1/20 of the mean particle size. The magnetite containing Co (cobalt) has a cubic shape. There are no specific limitations with respect to pH of the ferromagnetic powder as well as surface treatment thereof. For example, the surface treatment may be carried out using a substance containing an element such as titanium, silicon or aluminum, or using an organic compound such as carboxylic acid, sulfonic acid, sulfate (ester), phosphoric acid, phosphate (ester), a compound with adsorptivity having a heterocyclic compound containing a nitrogen atom such as benztriazole. The pH is preferably in the range of 5 to 10. The ferromagnetic iron oxide powder may be employed regardless of the ratio of a bivalent iron oxide and a trivalent iron oxide. The ferromagnetic powder is preferably employed in the range of 0.01 to 1 gram per 1 m$^2$ of the polyester (or PET) film, more preferably 0.03 to 0.5 gram per 1 m$^2$. The polyester film having the ferromagnetic powder preferably has a thickness in the range of 0.1 to 10 $\mu$m, more preferably 0.1 to 5 $\mu$m. The ferromagnetic powders may be employed singly or in combination.

On the other hand, in the case of using the support as the magnetic recording sheet according to the invention, the ferromagnetic powder is preferably employed in the range of 0.05 to 20 gram per 1 m$^2$ of the polyester (or PET) film, more preferably 0.1 to 10 gram per 1 m$^2$.

The polyester film having the ferromagnetic powder may further contain other known additives such as an antistatic agent, a dispersing agent, a lubricant and an abrasive.

Examples of the dispersing agent include a fatty acid having 12-18 carbon atoms such as caprylic acid, lauric acid, myristic acid, palmitic acid, stearic acid, oleic acid, linolic acid or stearolic acid, a metallic soap compound made of an alkaline metal or an alkaline earth metal and the above fatty acid, higher alcohol and higher alkyl ester. The dispersing agent is contained the polyester film (containing a ferromagnetic powder) in the amount of preferably 0.5 to 20 parts by weight based on 100 parts by weight of the polyester.

Examples of the lubricant include silicone oils such as polysiloxanes; inorganic powders such as a carbon black powder, a graphite powder and a molybdenum disulfide powder; plastics powders such as a polyethylene powder and a polytetrafluoroethylene powder; higher fatty acids; higher fatty acid esters; and fluorocarbon. The lubricant is contained the polyester film (containing a ferromagnetic powder) in the amount of preferably 0.2 to 20 parts by weight based on 100 parts by weight of the polyester. However, it is preferable not to use graphite and carbon black for the magnetic recording layer of the silver photographic material of the invention.

As the abrasive, there can be mentioned an inorganic powder having a Mohs' scale of hardness of not less than 5, preferably not less than 6. Examples of the inorganic powder include aluminium oxide (e.g., $Cr_2O_3$), iron oxide (e.g., $\alpha$-$Fe_2O_3$), oxide such as silicon carbide or titanium carbide, and diamond. A mean particle size of the powder is preferably in the range of 0.5 to 1.0 $\mu$m. The powder is contained in the polyester film (containing a ferromagnetic powder) in the amount of preferably 0.5 to 20 parts by weight based on 100 parts by weight of the ferromagnetic powder.

Examples of the antistatic agent include conductive powders such as carbon black (preferably having a mean particle size of 10-300 $\mu$m), graphite and carbon black grafted polymer; nonionic surfactants; anionic surfactants; and cationic surfactants. However, it is preferable not to use graphite and carbon black for the magnetic recording layer of the silver photographic material of the invention.

The photographic material and the magnetic recording sheet of the invention can be prepared in the following manner.

A polyester material is first fused. A portion of the fused polyester material or a separately fused polyester material is mixed with a ferromagnetic powder. Thus prepared fused polyester material containing no ferromagnetic powder and polyester material containing ferromagnetic using a coextruder die and cooled to form a composite film. In more detail, each polyester material is fused by heating at a temperature higher than its melting point by at least 10° C. The melted (fused) polyesters each is uniformly mixed or dispersed by means of a melt extruder or a single or double kneader to coextrude the polyester in the form of sheet (i.e., composite film) from a ring die or a flat die of a coextruder die. The polyester film containing a ferromagnetic powder preferably has a thickness in the range of 0.5 to 50 $\mu$m, more preferably 1 to 10 $\mu$m, and the polyester film containing no ferromagnetic powder preferably has a thickness in the range of 10 to 300 $\mu$m, more preferably 50 to 200 $\mu$m.

The composite coextruded from the die is subjected to a magnetic orientation by passing it through magnetic lines (generally passing it at a right angle to magnetic lines) before the film is hardened. A magnetic field of the magnetic lines is generally imparted to the film in the range of 500 to 3500 gauses by placing an electromagnet or a hollow solenoid coil in the vicinity of the film. The direction of the magnetic lines can be optionally altered. The orientated film is cooled and hardened by passing through a cooling drum or a cold water cistern. Thereafter the film is optionally subjected to monoaxial stretching in a mechanical direction (lengthwise direction), or diaxial stretching simultaneously or successively in a mechanical direction and in a widthwise direction. The stretching in a mechanical direction is preferably carried out in the range of 2 to 10 times, at a temperature in the range of the glass transition point to the melting point of the film.

The magnetic recording sheet according to the invention is prepared in the same manner mentioned above.

The magnetic recording sheet also comprises a composite film comprising a polyester film containing a ferromagnetic powder and a polyester film containing no ferromagnetic powder. Further, the polyester film containing a ferromagnetic powder comprises polyester having at least one group selected from those consisting of a sulfonic acid group, a group derived from sulfonic acid, a phosphoric acid group and a group derived from phosphoric acid (i.e., a group which may have a substituent group and its salt). The ferromagnetic powder is preferably contained in a more amount than the polyester film for the support of the silver halide photographic material as mentioned above.

In the silver halide photographic material of the invention, a silver halide emulsion layer is provided on the composite film. The silver halide emulsion layer is preferably provided on the polyester film containing no ferromagnetic powder. A surface of the polyester film may be subjected to a surface-activating treatment, and further a subbing layer may be provided on the surface which may be either subjected to the treatment or not. Examples of the surface-activating treatment include a chemical treatment, a mechanical treatment, a corona discharge treatment, a flame treatment, a ultraviolet light radiation treatment, a radio frequency radiation treatment, a glow discharge treatment, a plasma treatment, a laser radiation treatment, a mixed acid treatment and an ozone-oxidation treatment.

The polyester support (of the composite film) of the present invention preferably has a subbing layer thereon for increasing adhesion between the support and a photographic layer such as a photosensitive layer to be provided thereon Examples of materials of the subbing layer include a latex styrene-butadiene copolymer or vinylidene chloride copolymer and a hydrophilic binder such as gelatin. The preferable material of the subbing layer is the hydrophilic binder. Examples of materials of the hydrophilic binder include water-soluble polymers such as a gelatin derivative (e.g., gelatin), casein, agar, sodium alginate, starch, polyvinyl alcohol, poly-N-vinylpyrrolidone, acrylic acid copolymer and maleic anhydride copolymer; cellulose derivatives such as hydroxyethylcellulose and carboxymethyl cellulose; and latexes such as vinyl chloride copolymer, acrylic ester copolymer, vinylidene chloride copolymer and butadiene chloride copolymer. The most preferable material is gelatin.

Various hardners for gelatin may be employed for the subbing layer. The hardners include chromate (chrome alum), aldehydes (e.g., formaldehyde and glutaraldehyde), isocyanates, compounds containing halogen (e.g., 2,4-dichloro-6-hydroxy-s-triazine), and epichlorohydrin resins. The subbing layer may contain inorganic powders such as $SiO_2$ and $TiO_2$, and methyl methacrylate copolymer powder (particle size of 1-10 $\mu$m). The subbing layer can be formed on the support by known coating methods such as dip coating, roller coating, flood coating, curtain coating, air-knife coating, wire-bar coating, gravure coating, and extrusion coating.

The silver halide emulsion layer may be used for either a black and white photographic material or a color photographic material. The silver halide photographic material (silver halide emulsion layer) for color photographic material is described below.

The color photographic material may have at least one of layers consisting of a red-sensitive emulsion layer, a green-sensitive emulsion layer and a blue-sensitive emulsion layer on the support. The arrangement of those layers can be optionally determined. As a typical example, there can be mentioned silver halide photographic material provided with at least one sensitive layer consisting of plural silver halide emulsion layers (which are substantially same each other in sensitivity), and the sensitive layer is a red-sensitive layer, a green sensitive layer or a blue sensitive layer. In a multi-layered silver halide color photographic material, generally, the red-sensitive layer, the green sensitive layer and the blue sensitive layer are arranged from the support side in this order. The blue-sensitive layer, the green-sensitive layer and the red-sensitive layer may be arranged in this order from the support side. Further, the blue-sensitive layer, the red-sensitive layer and the green-sensitive layer may be arranged in this order from the support side. Further, two or more emulsion layers which are sensitive to the same color but show different sensitivities can be provided to enhance the sensitivity. Three emulsion layers can be provided to improve the graininess of the image. A non-light sensitive layer such as an intermediate layer may be interposed between two or more emulsion layers having the same color sensitivity.

The intermediate layer may contain couplers or DIR described in Japanese Patent Publications No. 61(1986)-43741, No. 59(1984)-113438, No. 59(1984)-113440, No. 61(1986)-20037 and No. 61(1986)-20038, The plural silver halide emulsion layers constituting each unit light sensitive layer are described in West Germany Patent No. 1,121,470, in U.K. Patent No. 923,045, in Japanese Patent Publications No. 57(1982)-112751, No. 62(1987)-200350, No. 62(1987)-206541, No. 62(1987)-206543, No. 56(1981)-25738, No. 62(1987)-63936, No. 59(1984)-202464, in Japanese Patent No. 55(1980)-34932, and No. 49(1974)-15495.

Silver halide grains may be regular grains having a regular crystal shape such as a cube, octahedron or tetradecahedron, those having an irregular shape such as sphere or tablet, those having a crystal defect such as twinning plane, or those having a combination of the shapes.

The silver halide grains may be either fine grains of mot more than about 0.2 $\mu$m in the diameter or giant grains having a projected area diameter or up to about 20 $\mu$m. The emulsion may be either a monodiperese emulsion or a polydisperese emulsion.

A photographic emulsion can be prepared in accordance with a method described in Research Disclosure No. 17643 (December 1978), pp. 22-23, "I. Emulsion Preparation and Types", and ibid. No. 18716 (November 1979), page 648, "Chimie et Physique Photographique" by P. Glafkides, Paul Montel, 1967; "Photographic Emulsion Chemistry" by G. F. Duffin, Focal Press, 1966; or "Making and Coating Photographic Emulsion" by V. L. Zelikman et al., Focal Press, 1964).

Further, monodisperse emulsions as described in U.S. Pat. Nos. 3,574,628 and 3,655,394, and U.K. Patent 1,413,748 is also preferred.

A tabular silver halide grain having an aspect ratio of not less than 5 can also be employed in the invention. A tabular silver halide grain can be easily prepared in accordance with methods described in "Photographic Science and Engineering" by Gutoff, vol. 14 (1970), pp. 248-257; U.S. Pat. Nos. 4,434,226, 4,414,310, 4,433,048, 4,439,520 and U.K. Patent No. 2,112,157.

The crystal structure may be either homogeneous or heterogeneous. In the heterogeneous structure, the halogen compositions positioned inside and outside are different each other. The crystalline may be of a layered structure. Some silver halides in which halogens are different each other may connect by epitaxial bond to form the crystal, or a salt other than silver halide such as silver rhodanite and lead oxide also may connect to the silver halide crystal by epitaxial bond. Mixture of grains having various crystal shapes also may be employed.

The emulsion used in the invention is usually subject to physical ripening, chemical ripening and spectral sensitization. Additives used in these process are described in Research Disclosure No. 17643 (December, 1978) and ibid., No. 18716 (November, 1979). The pages in which the additives are described are set forth below.

Known photographic additives used in the invention are also described in the above two Research Disclosures. The pages ar also set forth below.

| Additives | R.D. No. 17643 | R.D. No. 18716 |
| --- | --- | --- |
| 1. Chemical Sensitizer | pp. 23 | pp. 648, right column |
| 2. Sensitivity Promoter |  | same as above |
| 3. Spectral Sensitizer, Supersensitizer | pp. 23-24 | pp. 648, right column - 649, left column |
| 4. Brightening Agent | pp. 24 |  |
| 5. Antifogging Agent and Stabilizer | pp. 24-25 | pp. 649, right column |
| 6. Light Absorber, Filter Dye, and U.V. Absorber | pp. 25-26 | pp. 649, right column - 650, left column |
| 7. Color Stain Inhibitor | pp. 25, right | pp. 650, left column - right column |
| 8. Dye Image Stabilizer | pp. 25 |  |
| 9. Hardening Agent | pp. 26 | pp. 651, left column |
| 10. Binder | pp. 26 | same as above |
| 11. Plasticizer, Lubricant | pp. 27 | pp. 650, right column |
| 12. Coating Aid, and Surface Active Agent | pp. 26-27 | same as above |
| 13. Antistatic Agent | pp. 27 | same as above |

To inhibit deterioration in photographic properties caused by formaldehyde gas, a compound capable of reacting with and solidifying formaldehyde as disclosed in U.S. Pat. Nos. 4,411,987 and 4,435,503 can be preferably incorporated into the light sensitive material.

Various color couplers can be used for the invention. Concrete examples of the couplers are described in the patents cited in Research Disclosure No. 17643, VII C-G.

As a yellow coupler, preferred are those described in, for example, U.S. Pat. Nos. 3,933,501, 3,973,968, 4,022,620, 4,326,024, 4,401,752, 4,248,961, 4,314,023 and 4,511,649, Japanese Patent Publication No. 58(1983)-10739, U.K. Patents No. 1,425,020 and No. 1,476,760, and European Patent No. 249,473A.

As magenta couplers, 5-pyrazolone type and pyrazoloazole type compounds are preferred, and particularly preferred are those described in U.S. Pat. Nos. 4,310,619 and 4,351,897, European Patent No. 73,636, U.S. Pat. Nos. 3,061,432 and 3,725,067, Research Disclosure No. 24220 (June, 1984), Japanese Patent Provisional Publication No. 60(1985)-33552, Research Disclosure No. 24230 (June, 1984), Japanese Patent Provisional Publications No. 60(1985)-43659, No. 61(1986)-72238, No. 60(1985)-35730, No. 55(1980)-118043 and No. 60(1985)-185951, U.S. Pat. Nos. 4,500,630, 4,540,654 and 4,556,630, and WO(PCT)88/04795.

As cyan couplers, there can be mentioned phenol type and naphthol type couplers, and preferred examples are those described in U.S. Pat. Nos. 4,052,212, 4,146,396, 4,228,233, 4,296,200, 2,369,929, 2,801,171, 2,772,162, 2,895,826, 3,772,002, 3,758,308, 4,334,011 and 4,327,173, West German Patent Publication No. 3,329,729, European Patents No. 121,365A and No. 249,453A, and U.S. Pat. Nos. 3,446,622, 4,333,999, 4,753,871, 4,451,559, 4,427,767, 4,690,889, 4,254,212 and 4,296,199, and Japanese Patent Provisional Publication No. 61(1986)-42658.

A colored coupler may be used to compensate incidental absorption of a formed dye. The colored coupler is described in Research Disclosure No. 17643, VII-G, U.S. Pat. No. 4,163,670, Japanese Patent Publication No. 57(1982)-39413, U.S. Pat. Nos. 4,004,929 and 4,138,258, and U.K. Patent No. 1,146,368.

As couplers which give a color developing dye exhibiting a proper diffusion, preferred are those described in U.S. Pat. No. 4,366,237. U.K. Pat. No. 2,125,570, European Patent No. 96,570, and West German Patent Publication No. 3,234,533.

Typical examples of polymerized dye-forming couplers are described in U.S. Pat. Nos. 3,451,820, 4,080,211, 4,367,282, 4,409,320 and 4,576,910, and U.K. Pat. No. 2,102,173.

A coupler which releases a photographically useful residue in accordance with a coupling reaction can be also used in the invention. A DIR coupler which releases a development inhibitor is employable. The DIR coupler is described in Research Disclosure No. 17643, VII-F, Japanese Patent Provisional Publications No. 57(1982)-151944, No. 57(1982)-154234, No. 60(1985)-184248 and No. 63(1988)-37346, and U.S. Pat. No. 4,248,962.

A coupler which imagewise releases a nucleating agent or a development accelerator in a development process is also available. This coupler is described in U.K. Patents No. 2,097,140 and No. 2,131,188, and Japanese Patent Provisional Publications No. 59(1984)-157638 and No. 59(1984)-170840.

Examples of other couplers employable for the photographic material of the invention include a competing coupler, a polyvalent coupler, a DIR redox compound-releasing coupler, a DIR coupler-releasing coupler, a DIR coupler-releasing redox compound, a DIR redox-releasing redox compound, a coupler which releases a dye having restoration to original color after an elimination reaction, a bleach accelerator-releasing coupler and a coupler which releases ligand. The competing coupler is described in U.S. Pat. No. 4,130,427. The polyvalent coupler is described in U.S. Pat. Nos. 4,283,472, 4,338,393 and 4,310,618. The DIR redox compound-releasing coupler, the DIR coupler releasing coupler, the DIR coupler-releasing redox compound and the DIR redox-releasing redox compound are described in Japanese Patent Provisional Publications No. 60(1985) 185950 and No. 62(1987)-24252. The coupler which releases a dye having restoration to original color after elimination is described in European Patent No. 173,302A. The bleach accelerator-releasing coupler is described in Research Disclosure No. 11449, ibid. No. 24241, and Japanese Patent Provisional Publication No. 61(1986)-201247. The coupler which releases a ligand is described in U.S. Pat. No. 4,553,477. The coupler which releases leuco-pigment is described in Japanese Patent Provisional Publication No. 63(1988)-75747.

The couplers can be introduced into the photographic material by various known dispersing methods.

Examples of a high-boiling solvent used in an O/W dispersing method are described in U.S. Pat. No. 2,322,027.

Examples of the high-boiling organic solvent having a boiling point of not lower than 175° C. under a normal pres sure used in the O/W dispersing method include phthalates (e.g., dibutyl phthalate, dicyclohexyl phthalate, di-2-ethylhexyl phthalate, decyl phthalate, bis(2,4-di-t-amylphenyl)phthalate, bis(2,4-di-t-amylphenyl)isophthalate, bis(1,1-diethylpropyl)phthalate); esters of phosphoric acid or phosphoric acid (e.g., triphenyl phosphate, tricresyl phosphate, 2-ethylhexyldiphenyl phosphate, tricyclohexyl phosphate, tri-2-ethylhexyl phosphate, tridodecyl phosphate, tributoxyethyl phosphate, trichloropropyl phosphate, di-2-ethylhexylphenyl phosphate); benzoates (e.g., 2-ethylhexyl benzoate, dodecyl benzoate, 2-ethylhexyl-p-hydroxybenzoate); amides (e.g., N,N-diethyldodecanamide, N,N-diethyllaurylamide, N-tetradecylpyrrolidone); alcohols or phenols (e.g., isostearyl alcohol, 2,4-di-tert-amylphenol); aliphatic carboxylic esters (e.g., bis(2-ethylhexyl) sebacate, dioctyl azelate, glycerol tributylate, isostearyl lactate, trioctyl citrate); aniline derivatives (e.g., N,N-dibutyl-2-butoxyl-5-tert-octylaniline); and hydrocarbons (e.g., paraffin, dodecyl benzene, diisopropyl naphthalene). An organic solvent having a boiling point of not lower than about 30° C. preferably in the range of 50° C. to about 160° C. can be used as an auxiliary solvent. Examples of the auxiliary solvent include ethyl acetate, butyl acetate, ethyl propionate, methyl ethyl ketone, cyclohexanone, 2-ethoxyethyl acetate and dimethylformamide.

A process of a latex dispersing method, effects thereof and concrete examples of latex for impregnation are described in U.S. Pat. No. 4,199,363, West German Patent Applications (OLS) No. 2,541,274 and No. 2,541,230.

In the photographic material, the total thickness of all hydrophilic colloid layers on the emulsion side is preferably not more than 28 μm. The film swelling rate ($T_{1/2}$) is preferably not more than 30 seconds. The film thickness is determined after being stored at a temperature of 25° C. and a relative humidity of 55% for two days. The film swelling rate ($T_{1/2}$) can be determined by a known method in the art, for example, by using a swellometer of the type as described in A. Green et al, "Photographic Science and Engineering", Vol. 19, No. 2. pp. 124–129. $T_{1/2}$ is defined as the time taken until half the saturated film thickness is 90% of the maximum swollen film thickness reached when the photographic material is processed with a color developer at a temperature of 30° C. over 195 seconds.

The film swelling rate ($T_{1/2}$) can be adjusted by adding a film hardner to gelatine as a binder or altering the ageing condition after coating. The percentage swelling of the photographic material is preferably in the range of 150 to 400%. The percentage swelling can be calculated from the maximum swollen film thickness determined as described above in accordance with the following equation:

$$\frac{(\text{maximum swollen film thickness} - \text{film thickness})}{\text{film thickness}}$$

In the color photographic materials according to the present invention, its development processing can be carried out according to conventional methods as described in RD (mentioned above) No. 17643, pp. 28–29 and RD No. 18716, P. 615, left and right columns.

For the purpose of simplifying and speeding up the processing, the silver halide color photographic material may contain a color developing agent, preferably in the form of its precursor. Examples of the precursors include indoaniline compounds described in U.S. Pat. No. 3,342,597, and Schiff base compounds described in U.S. Pat. No. 3,342,599, RD No. 14850 and RD No. 15159.

Subsequently, the silver halide photographic material enclosed with a cylindrical cartridge (patrone, hereinafter referred to as a cylindrical cartridge) according to the present invention is described.

The cylindrical cartridge comprises a silver halide photographic film comprising a support and a magnetic recording film which are prepared by coextrusion of a polyester material containing no ferromagnetic powder and a polyester material containing a ferromagnetic powder, and a cylindrical cartridge having a spool for winding the photo graphic material therearound. The cylindrical cartridge has preferably a film feeding means.

In a conventional cylindrical cartridge, the film is incorporated in the cylindrical cartridge under the condition loosely wound around a spool. Even if the spool is turned in reverse direction to the film-wound direction, the film can be fed out the cylindrical cartridge. Therefore, the conventional cylindrical cartridge has a structure in which the wound film front (film leader) is drawn out of the cylindrical cartridge, by an appropriate length, and the cylindrical cartridge is needed to be loaded to a camera by fitting the film leader to a film feeding member of the camera.

However, such fitting operation is not troublesome but needs some skill, often resulting in a mistake, such as exposure of an intact film. Accordingly, there has been a demand for a camera system requiring no such operation.

Such system can be accomplished by the cylindrical cartridge having a film-feeding element, in which a photographic film can be fed from the inside of a cylindrical cartridge, according to the invention. Use of the cylindrical cartridge dose not need the fitting operation of engaging the film leader onto the film feeding member. Although a conventional cylindrical cartridge does not meet the requirements of such a system, the cylindrical cartridge of the invention can be applied to the system as described below.

The above cylindrical cartridge is mainly made of synthetic plastics. Examples of the plastics include polystyrene, polyethylene, polypropylene, polymonochlorotrifluoroethylene, polyvinylidene chloride, polyvinyl chloride, vinyl chloride-vinyl acetate copolymer, acrylonitrile-butadiene-styrene copolymer, poly(methyl mathacrylate), polyvinyl formal, polyvinyl butyral, poly(ethylene terephthalate), teflon, nylon, phenol resins, and melamine resins. Preferred are polystyrene, polyethylene and polypropylene.

The plastics may contain a plasticizer by adding it in a molding procedure, if desired. Examples of the plsticizer include trioctyl phosphate, tributyl phosphate, dibutyl phthalate, eiethyl sebacate, methyl amyl ketone, nitrobenzene, γ-valerolactone, di-n-octyl succinate, bromonaphthalene, and butyl palmitate.

The plastic cylindrical cartridge may contain various antistatic agents such as carbon black, metal oxide particles, surface active agents such as nonionic, anionic, cationic and betaine type, and polymer. Known cylindrical cartridges containing these antistatic agents are described in Japanese Patent Provisional Publications No. 1(1989)-312537 and No. 1(1989)-312538. The antistatic cylindrical cartridge preferably shows an electric resistance of not more than $10^{12}$ Ω at 25° C. and 25% RH. The cylindrical cartridge is generally prepared by adding carbon black or pigments into the plastic material.

The cylindrical cartridge may have the standard size of 25 mm diameter as currently adopted. Alternatively, its diameter may be 22 mm or less, and preferably the range of 14 to 20 mm. The preferable range will enable a size reduction of a camera. The volume of the cylindrical cartridge generally is not more than 30 cm³, preferably not more than 25 cm³, more preferably not more than 20 cm³. The weight of the plastic employed for the cylindrical cartridge including its case is in the range of 1 to 25 gram, and preferably 5 to 15 grams. The ratio of the internal space of the cylindrical cartridge case to the volume of the cylindrical cartridge and its case is in the range of 4 to 0.7, preferably 3 to 1.

In the case of a cylindrical cartridge for J135 color light sensitive material which is a preferred embodiment in the invention, the total weight of the resin employed for the cylindrical cartridge and its case is generally in the range of 1 to 25 grams, preferably 5 to 15 grams.

The cylindrical cartridge (a silver halide photographic material enclosed with a cylindrical cartridge) having a film-feeding element of the invention is desirable to use a new type camera corresponding to the above system. The specific examples are described by referring to the attached drawings.

Figure 3:
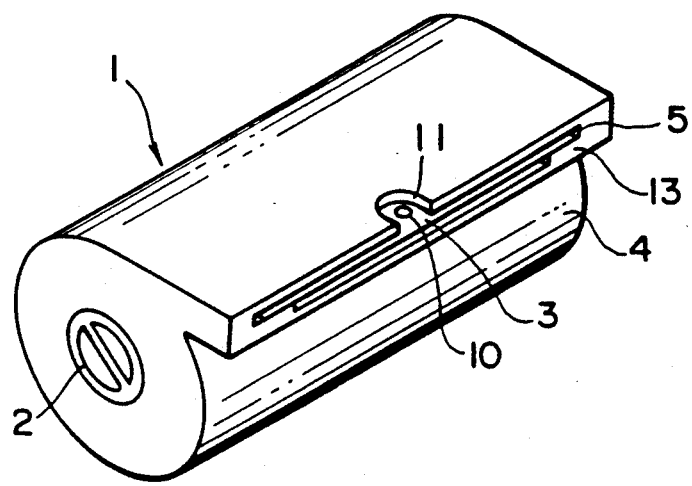
FIG. 3 is a perspective view of a cylindrical cartridge which is employable in combination with a photographic film according to the invention.
Figure 4:
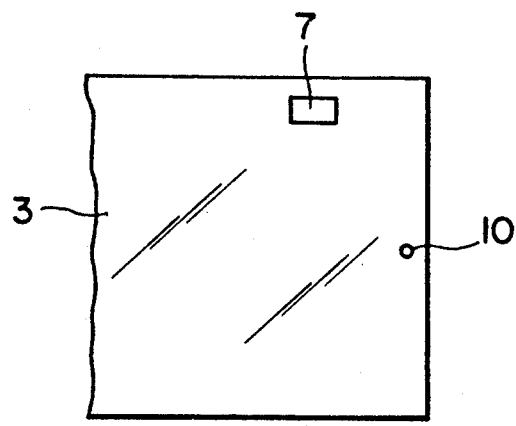
FIG. 4 is a plain view of a photographic film enclosed with the cartridge of FIG. 3.
Figure 5:
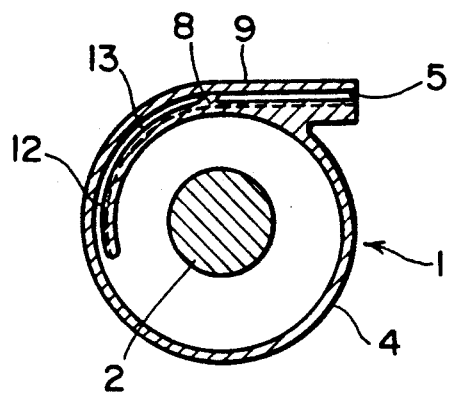
FIG. 5 is a sectional view of the cylindrical cartridge of FIG. 3.
Figure 6:
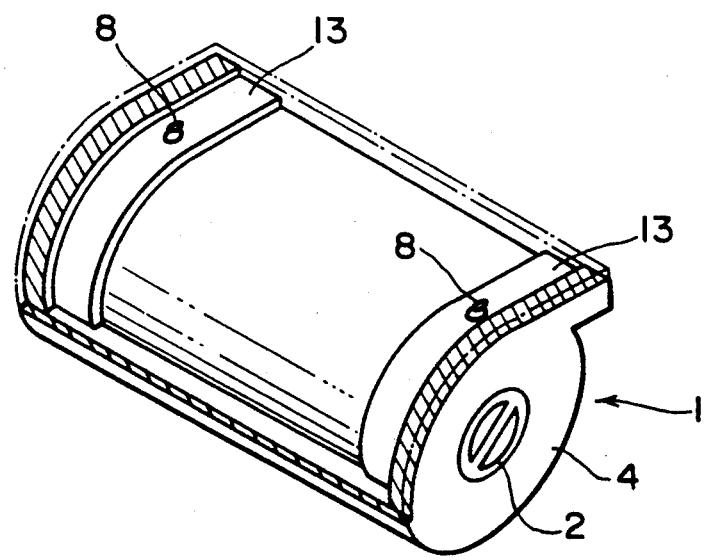
FIG. 6 is a partially cutaway view of the cylindrical cartridge of FIG. 3.

FIG. 3 shows one example of the cylindrical cartridge, and FIGS. 4 to 6 show the inside structures of the example.

As shown in FIG. 3, the cylindrical cartridge 1 has a generally cylindrical main body portion 4 in which is rotatably mounted a spool 2, on which the film 3 is wound. The cylindrical cartridge 1 has an integrally formed mouth portion 5 extending tangentially from the side of the main body portion 4. The mouth portion 5 defines an exit slit through which the film 3 is pulled out from the cylindrical cartridge. As depicted in FIG. 4, the leading end of the film 3 has a hole 10 formed at the center thereof which aligns with a cutout 11 shown in FIG. 3 in the mouth portion 5 of the cylindrical cartridge 1. The film 3 has perforation 7 formed along its edge. As shown in FIGS. 5 and 6, rail-like guides 13 are provided along the sides of the interior of the mouth portion 5. Protrusions 8 having a peak part 9, formed on the guides 13, protrude in the direction of movement of the film as the film is pulled out of the cylindrical cartridge 1, through the film passageway 12.

Figure 7:
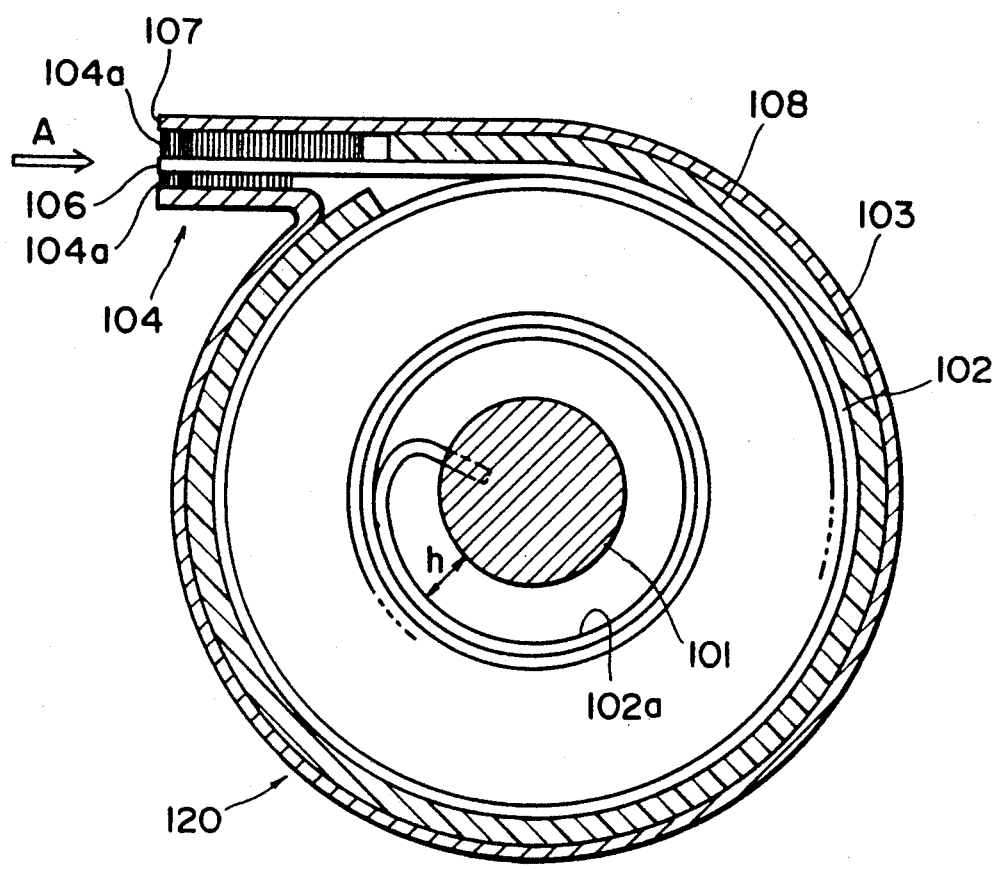
FIG. 7 is a side elevation of another cylindrical cartridge employable for encasing a photographic film of the invention.
Figure 8:
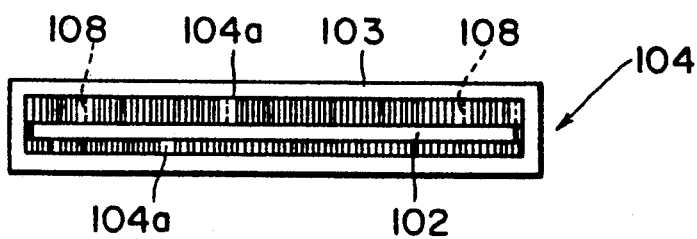
FIG. 8 is a front elevation of a part of the cylindrical cartridge of FIG. 7.

FIGS. 7 and 8 show another example in which the end of a roll film can be fed from the inside of the cylindrical cartridge by turning the spool. The cylindrical cartridge of the type is described in Japanese Patent Application No. 1(1989)-21862. Cylindrical cartridge 120 is comprised of spool 101, photographic film 102 which wounded around spool 101 in a roll form with one end being engaged by spool 101 and cartridge body 103. Spool 101 is attached to the inside of cylindrical cartridge body 103 in such a manner that it can be rotated on its axis by any member provided outside of cartridge body 103. Cartridge body 103 has film outlet 104 through which photographic film 102 is supplied. Onto the inner side of outlet 104 is attached light shielding member 104a for protecting the inside of cartridge body from light exposure.

A pair of ribs 108 having a width of about 15 to 20% of the film width are provided on the inner side of cart. ridge body 103 along the circumferential direction at the positions of the both edges (in the width direction) of film 102. Each rib 108 has an opening to outlet 104 so that film 102 be fed through from outlet 104. In this sample, the position of film end 106 of film 102 is brought into line with outlet end 107.

The pair of ribs 108 are positioned in contact with the outer side of the roll of film 102 to press it so as to maintain film 102 in a tightly wound state around spool 101.

The outer diameter of spool 101 is determined as follows.

Figure 9:
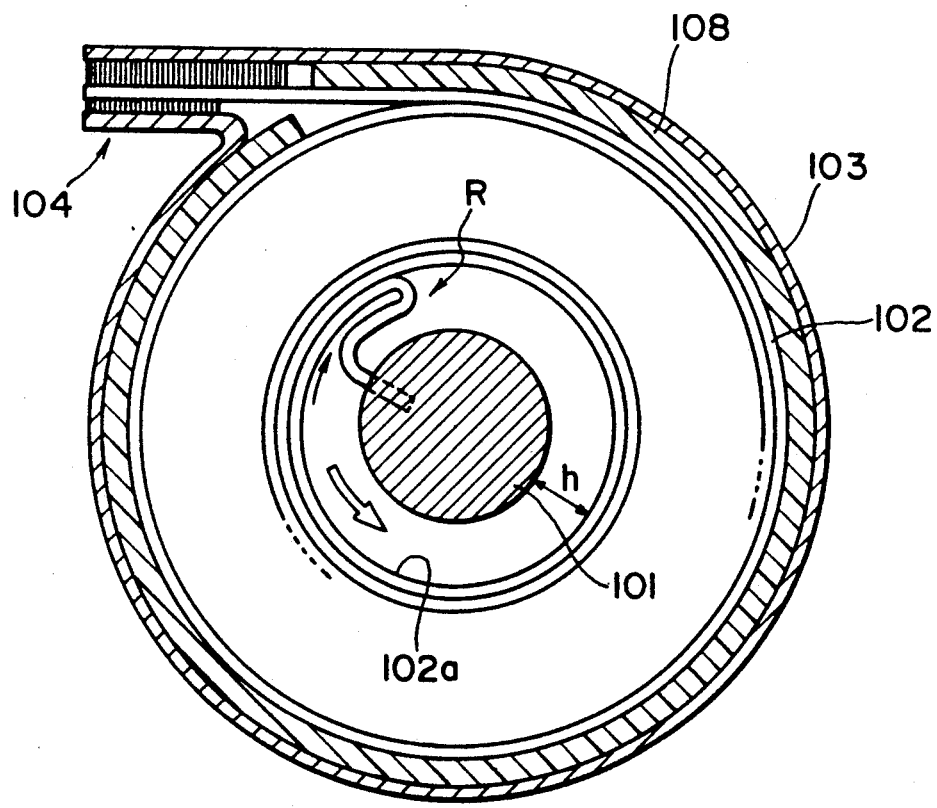
FIG. 9 is a side elevation of the cylindrical cartridge of FIG. 7 under different conditions.

It is difficult to wind film 102 tightly around spool 101 with its innermost side 102a being in contact with the periphery of spool 101, and a gap (h) is unavoidably formed between innermost side 102a and spool 101. In the case that the gap (h) is too large, film 102 goes back (reversion) as shown in FIG. 9. Therefore, the outer diameter of spool 101 should be set so that the gap (h) between film innermost side 102a and spool 101 may be within 2 mm. That is, $$b/2 = a/2 + h + c \cdot d + t$$

wherein "a" is the outer diameter of spool, "b" is the inner diameter of cartridge body, "t" is the thickness of the rib, "c" is the thickness of film, and "d" is the number of turns of film (dependent on film length), accordingly, $$a/2 = b/2 - t - h - c \cdot d$$

which leads to;

$$h = b/2 - a/2 - c \cdot d - t$$

Then $h \leq 2$ mm is inserted to the equation, and the outer diameter of the spool (a) can be calculated from the formula:

$$b/2 - t - c \cdot d - 2 \leq a/2$$

With the gap (h) falling within 2 mm, the reversion of film 102 can be prevented by setting the torque of the spool at 0.8 kgf.cm or less.

Rib 108 attached to the inner surface of cartridge body 103 does not always need to extend over the entire circumference and may be provided on a part of it. Further, rib 108 may be provided over the entire width of the film.

Rib 108 should be made of a material which does not cause damage to the surface of film 102, such as a plastic. A material having elasticity to some extent, e.g., a urethane resin, may be chosen. The thickness of rib 108 is determined so that film 102 tightly wound around spool 101 and put in cartridge body 103 may compress rib 108, then the outer side of the film roll is pressed back by the elastic force of compressed rib 108. Thus, even when film 12 has been pulled out of cartridge body 103 to a considerable length and the outer diameter of the film roll decreases, film 102 can be maintained in a tightly wound state by the interaction between film 102 and rib 108.

The mode of light shielding at outlet 104 is not limited. For example, a light shielding member made of felt may be attached, or the film outlet may have an open-and-close mechanism so that it is kept closed until necessary. Film end 106 does not always need to be set at the line of tip 107 of film outlet 104 as long as it is inside cartridge body 103. Film end 106 is preferably within the portion of outlet 104.

Figure 10:
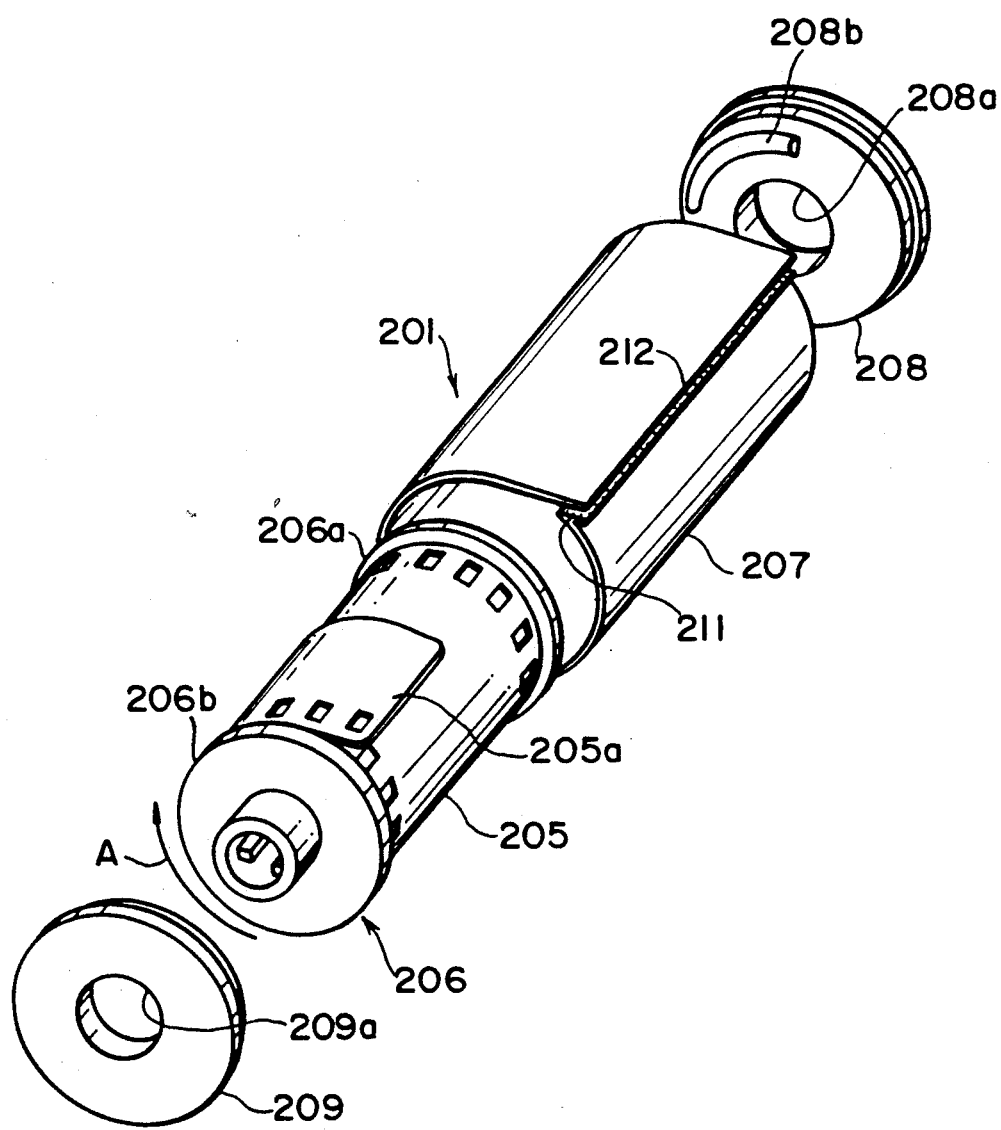
FIG. 10 is a diagrammatical perspective view of other cylindrical cartridge employable in combination with a photographic film of the invention.
Figure 11:
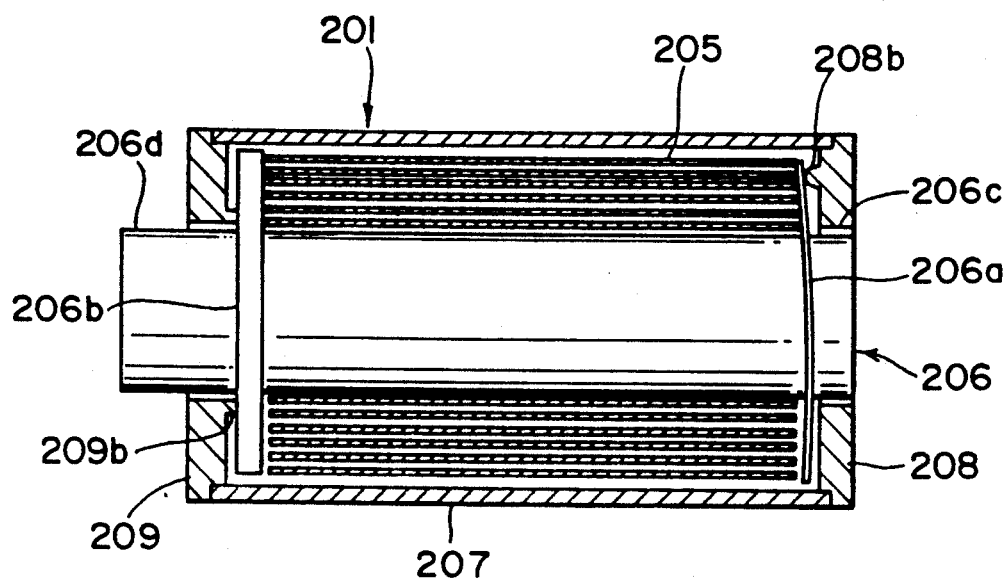
FIG. 11 is a sectional view showing an internal structure of a cylindrical cartridge of FIG. 10.

FIGS. 10 and 11 show a different example. Such cylindrical cartridge is described in Japanese Patent Application No. 1(1989)-172594. The cylindrical cartridge has a structure in which a spool has a modified flange so that it rotates to feed the film while pressing the edge of the wound film at the periphery thereof. Cylindrical cartridge 201 is comprised of spool 206 having around it a roll of photographic film 205, cartridge body 207, and side plates 208 and 209 which function to hold spool 206 in a rotatable state and to shut cartridge body 207 from both sides against light.

Spool 206 has flange 206a having a reduced thickness so as to have flexibility and flange 206b having increased thickness and having no flexibility, and all (spool and flanges) are integrally molded from plastics. The whole length of photographic film is wound up to the end 205a around spool 206, with one end being fixed to spool 206 between flanges 206a and 206b, to make a roll in such a manner that each edge of the film roll in the width direction skirts along the inner side of flange 206a or 206b. Cartridge body 207 has film outlet 212 to which light shielding member (teremp) 211 is attached.

Side plate 208 has a bearing hole 208a in the center for spool end 206c (see FIG. 11) and in the inner side thereof long projection 208b for pressing part of flange 206a. Side plate 209 has bearing hole 209a in the center thereof for spool end 206d and in the vicinity of bearing hole 209a projection 209b (see FIG. 11) for reducing friction between the inner side of side plate 209 and flange 206b.

In FIG. 11, the inner size of projections 208b and 209b is smaller than the outer size of flanges 206a and 206b, respectively (the position of projections 208b and 209b is within the diameter of flanges 206a and 206b, respectively). Projection 208b presses part of flexible flange 206a to cause deformation, whereby the outer part of the roll of film 205 is held between flanges 206a, 206b more firmly than the inner part. Accordingly, on rotating spool 206 to direction A indicated in FIG. 10, film end 205a is fed out of cartridge body 207 through outlet 212 by the frictional engagement between flanges 206a, 206b and both edges of film 205.

Alternatively, the inner size of long projection 208b and projection 209b may be greater than the outer size of flanges 206a and 206b, respectively. In this case, an outside member of a camera is provided to press spool 206 from the side of flange 206b toward the direction of flange 206a, whereby the inner size of flanges 206a and 206b becomes smaller than the outer diameter of film roll 205, becoming capable of pressing both edges of the film roll. As a result, film 205 can be fed out of cartridge body 207 by rotation of spool 206.

Figure 12:
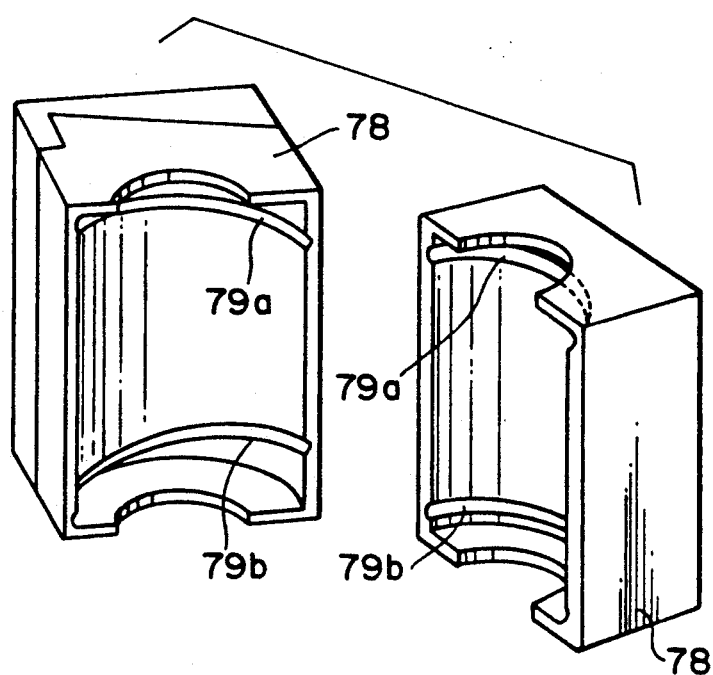
FIG. 12 is a view showing an outer case of a cylindrical cartridge employable for a photographic film of the invention.
Figure 13:
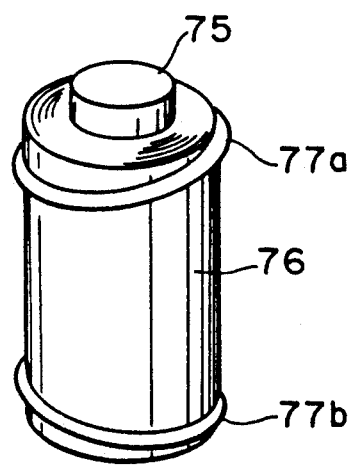
FIG. 13 is a view showing relationship of a spool of the above outer case and a photographic film.
Figure 14:
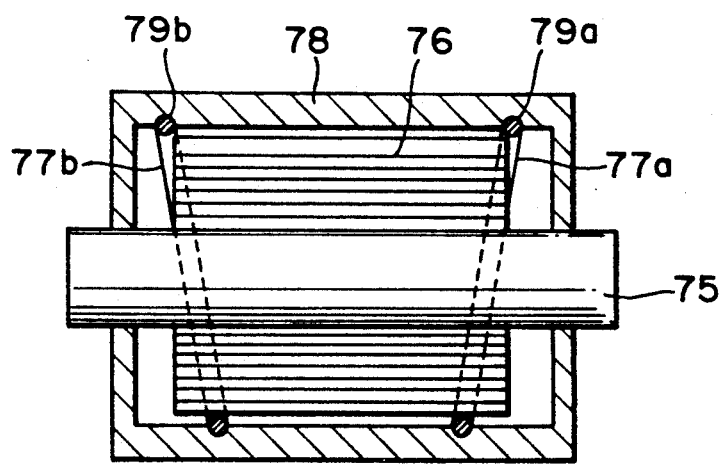
FIG. 14 is a view showing an internal structure of FIG. 13.

In addition, the cylindrical cartridge described in U.S. Pat. Nos. 4,834,306, 4,846,418, and 4,832,275 as shown in FIGS. 12, 13 and 14 are also preferably used in the invention.

In these Figures, photographic film 76 is tightly wound spool 75, and the film roll is maintained tight by a pair of rings 77a and 77b positioned at both edges of the film roll. In the inner side of cartridge body 78, grooves 79a and 79b to which rings 77a and 77b are fit are formed making an angle with the axial direction of cartridge body 78. Accordingly, rings 77a and 77b contact the outer surface of the roll of film 76 having an angle with the axial direction of spool 75 to thereby prevent loosing of the roll. Rings 77a and 77b are rotatable while sliding in grooves 79a and 79b, respectively.

Being maintained tightly wound around spool 75 by rings 77a and 77b, photographic film 76 is fed out through the outlet (not shown) on rotating spool 75 to the direction opposite to the film winding direction.

As described previously, use of a cylindrical cartridge having a film feeding means needs a film having excellent mechanical strength. Further, with minimizing of diameter of a cylindrical cartridge the thickness of the photographic film is required to decrease. The photographic material of the invention, which is obtained by coextrusion of polyester materials (preferably the polyester material having a hydrophilic group or containing a hygroscopic material), has satisfactory mechanical strength and has no defect of retaining easy curling tendency even if its thickness is thin. Accordingly, the photographic material enclosed with the cylindrical cartridge having a film-feeding means according to the invention is useful.

The present invention is further described by the following examples.

First examples of the silver halide photographic material having a magnetic recording film are described.

EXAMPLE 1

[Preparation of Poly(ethylene terephthalate)]

100 Weight parts of dimethyl terephthalate, 70 weight parts of diethylene glycol, 10 weight parts of dimethyl 5-sodiumsulfoisophthalate and 10 weight parts of dimethyl adipate were mixed, and 0.1 weight part of calcium acetate and 0.03 weight part of antimony trioxide were added thereto to conduct interesterification in a usual manner. To the resultant product was added 0.5 weight part of trimethyl phosphate, followed by gradually raising the temperature and gradually diminishing the pressure to a final temperature of 280° C. and a final pressure of 1 mmHg or less to conduct coesterification, whereby poly(etylene terephthalate) [A] was prepared.

Separately, poly(ethylene terephthalate) [B] was prepared in the same manner as preparation of poly(ethylene terephthalate) [A] except for employing 20 weight parts of dimethyl terephthalate instead of 10 weight parts of dimethyl 5-sodiumsulfoisophthalate and 10 weight parts of dimethyl adipate.

0.1 Weight part of Co-doped $\gamma$-$Fe_2O_3$ fine powder (Hc=700 Oe) having a mean particle size of 0.3 $\mu$m and a ratio of the particle size of 8, 0.02 weight part of calcium carbonate, 0.1 weight part of calcium stearate and 60 weight parts of the above poly(ethylene terephthalate) [A] were homogeneously kneaded by a twin-screw kneader to extrude under melting.

Separately, the poly(ethylene terephthalate) [B] was extruded under melting. The extruded product of the poly(ethylene terephthalate) [A] and the extruded product the poly(ethylene terephthalate) [B] were extruded by a coextruder from each adjusted lip gap to prepare a laminated sheet. The sheet was stretched up to 3.3 times in a mechanical direction at 90° C., and stretched up to 3.0 times in a width direction at 105° C., and then was placed at 210° C. for 5 seconds, whereby a composite sheet consisting of the poly(ethylene terephthalate) [A] film containing a ferromagnetic powder having thickness of 5 μm and the poly(ethylene terephthalate) [B] film having thickness of 120 μm was prepared.

The surface of the poly(ethylene terephthalate) [B] (side of containing no ferromagnetic powder) of the composite sheet was subjected to corona discharge treatment at 0.02 kVA.min./m$^2$, and a subbing layer was then coated thereon.

| Subbing Layer Composition: | |
|---|---|
| Gelatin | 3 g |
| Distilled water | 250 cc |
| Sodium di(2-ethylhexyl)sulfosuccinate | 0.05 g |
| Formaldehyde | 0.02 g |

Subsequently, light sensitive layers having the following compositions were coated on the subbing layer, in order.

Composition of Light Sensitive Layers

The composition and its amount (g/m$^2$) of each of the layers set forth below. The amount of each component means the coating amount. The values for the silver halide emulsion mean the coating amount of silver.

| The first layer (Antihalation layer) | |
|---|---|
| Black colloidal silver | 0.18 |
| Gelatin | 0.40 |
| The second layer (Intermediate layer) | |
| 2,5-pentadecylhydroquinone | 0.18 |
| EX. 1 | 0.07 |
| EX. 3 | 0.02 |
| EX. 12 | 0.002 |
| U-1 | 0.06 |
| U-2 | 0.08 |
| U-3 | 0.10 |
| HBS-1 | 0.10 |
| HBS-2 | 0.02 |
| Gelatin | 1.04 |
| The third layer (The first red sensitive layer) | |
| Emulsion A | silver: 0.25 |
| Emulsion B | silver: 0.25 |
| Sensitizing dye I | 6.9 × 10$^{-5}$ |
| Sensitizing dye II | 1.8 × 10$^{-5}$ |
| Sensitizing dye III | 3.1 × 10$^{-5}$ |
| EX. 2 | 0.335 |
| EX. 10 | 0.020 |
| Gelatin | 0.87 |
| The fourth layer (The second red sensitive layer) | |
| Emulsion C | silver: 1.0 |
| Sensitizing dye I | 5.1 × 10$^{-5}$ |
| Sensitizing dye II | 1.4 × 10$^{-5}$ |
| Sensitizing dye III | 2.3 × 10$^{-4}$ |
| EX. 2 | 0.400 |
| EX. 3 | 0.050 |
| EX. 10 | 0.015 |
| Gelatin | 1.30 |
| The fifth layer (The third red sensitive layer) | |
| Emulsion D | silver: 1.40 |
| Sensitizing dye I | 5.1 × 10$^{-5}$ |
| Sensitizing dye II | 1.4 × 10$^{-5}$ |
| Sensitizing dye III | 2.3 × 10$^{-4}$ |
| EX. 3 | 0.010 |
| EX. 4 | 0.080 |
| EX. 2 | 0.097 |
| HBS-1 | 0.22 |
| HBS-2 | 0.10 |
| Gelatin | 1.63 |
| The sixth layer (Intermediate layer) | |
| EX-5 | 0.040 |
| HBS-1 | 0.020 |
| Gelatin | 0.80 |
| The seventh layer (The first green sensitive layer) | |
| Emulsion A | silver: 0.15 |
| Emulsion B | silver: 0.15 |
| Sensitizing dye V | 3.0 × 10$^{-5}$ |
| Sensitizing dye VI | 1.0 × 10$^{-4}$ |
| Sensitizing dye VII | 3.8 × 10$^{-4}$ |
| P-5 | 0.260 |
| EX-1 | 0.021 |
| EX-7 | 0.030 |
| EX-8 | 0.025 |
| HBS-1 | 0.100 |
| HBS-2 | 0.005 |
| Gelatin | 0.63 |
| The eighth layer (The second green sensitive layer) | |
| Emulsion C | silver: 0.45 |
| Sensitizing dye V | 2.1 × 10$^{-5}$ |
| Sensitizing dye VI | 7.0 × 10$^{-5}$ |
| Sensitizing dye VII | 2.6 × 10$^{-4}$ |
| P-5 | 0.094 |
| EX-8 | 0.018 |
| EX-7 | 0.026 |
| HBS-1 | 0.160 |
| HBS-3 | 0.003 |
| Gelatin | 0.50 |
| The ninth layer (The third green sensitive layer) | |
| Emulsion E | silver: 1.05 |
| Sensitizing dye V | 3.5 × 10$^{-5}$ |
| Sensitizing dye VI | 8.0 × 10$^{-5}$ |
| Sensitizing dye VII | 3.0 × 10$^{-4}$ |
| EX-13 | 0.015 |
| EX-11 | 0.100 |
| EX-1 | 0.025 |
| HBS-1 | 0.25 |
| HBS-2 | 0.10 |
| Gelatin | 1.54 |
| The tenth layer (Yellow filter layer) | |
| Yellow colloidal silver | silver: 0.05 |
| EX-5 | 0.08 |
| HBS-1 | 0.03 |
| Gelatin | 0.95 |
| The eleventh layer (The first blue sensitive layer) | |
| Emulsion A | silver: 0.08 |
| Emulsion B | silver: 0.07 |
| Emulsion F | silver: 0.07 |
| Sensitizing dye VIII | 3.5 × 10$^{-4}$ |
| EX-9 | 0.721 |
| EX-8 | 0.042 |
| HBS-1 | 0.28 |
| Gelatin | 1.10 |
| The twelfth layer (The second blue sensitive layer) | |
| Emulsion G | silver: 0.45 |
| Sensitizing dye VIII | 2.1 × 10$^{-4}$ |
| EX-9 | 0.154 |
| EX-10 | 0.007 |
| HBS-1 | 0.05 |
| Gelatin | 0.78 |
| The thirteenth layer (The third blue sensitive layer) | |
| Emulsion H | silver: 0.77 |
| Sensitizing dye VIII | 2.2 × 10$^{-4}$ |
| EX-9 | 0.20 |
| HBS-1 | 0.07 |
| Gelatin | 0.69 |
| The fourteenth layer (The first protective layer) | |
| Emulsion I | silver: 0.5 |
| U-4 | 0.11 |
| U-5 | 0.17 |
| HBS-1 | 0.05 |
| Gelatin | 1.00 |
| The fifteenth layer (The second protective layer) | |
| Mixture of grains of polymethyl methacrylate (mean grain size: about 1.5 μm) | 0.54 |
| S-1 | 0.20 |
| Gelatin | 1.20 |

The abbreviations of the components mean the following compounds.
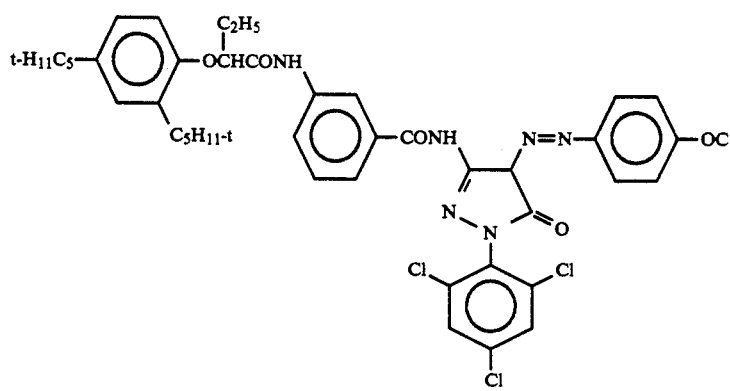 EX-1
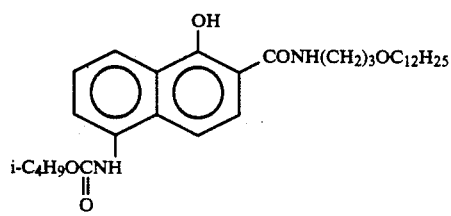 EX-2
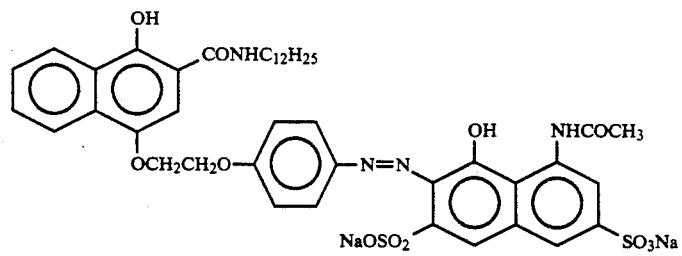 EX-3
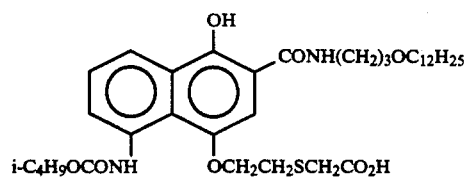 EX-4
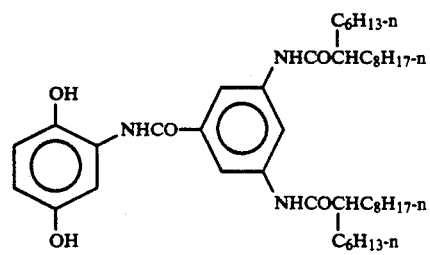 EX-5

-continued
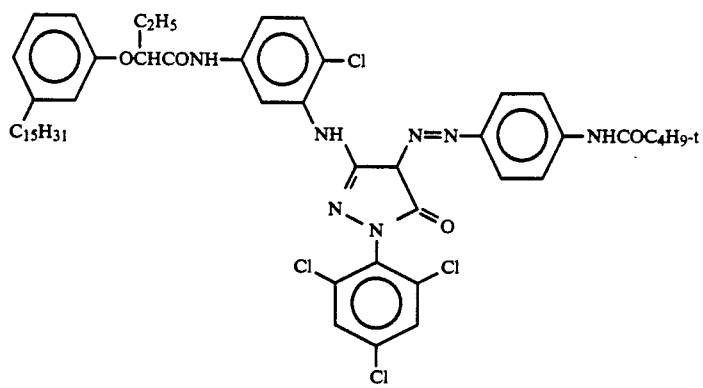
EX-7
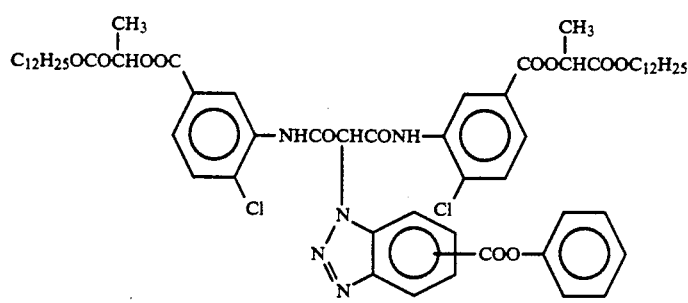
EX-8
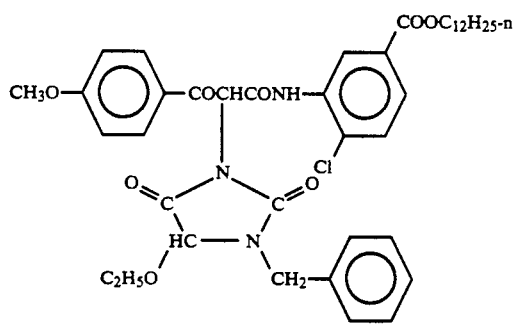
EX-9
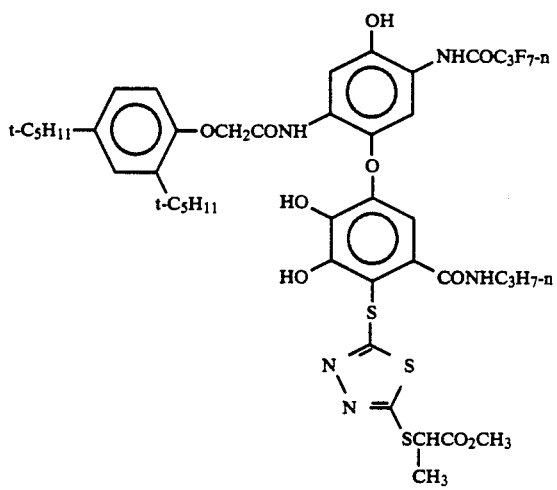
EX-10

-continued
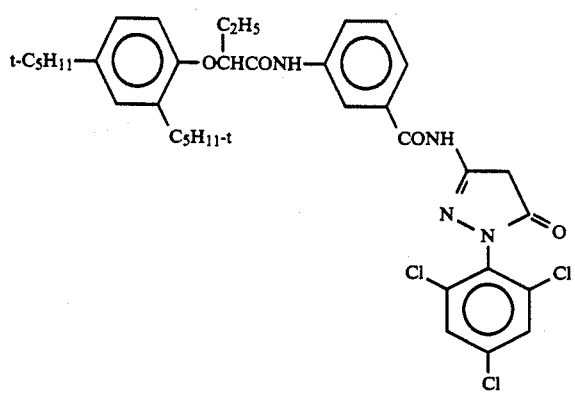 EX-11
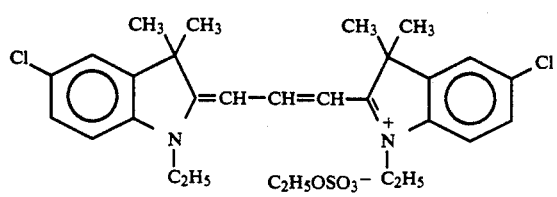 EX12
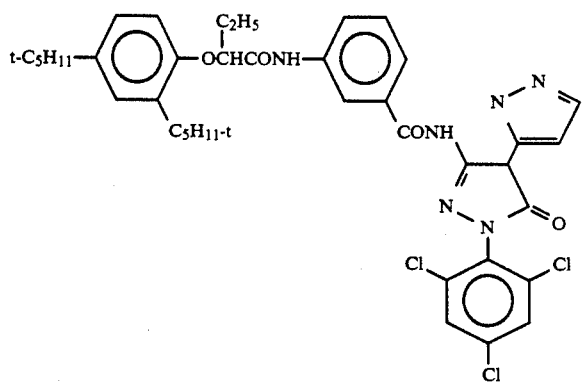 EX-13
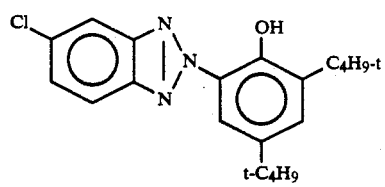 U-1
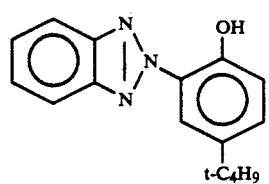 U-2
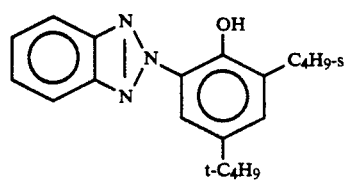 U-3

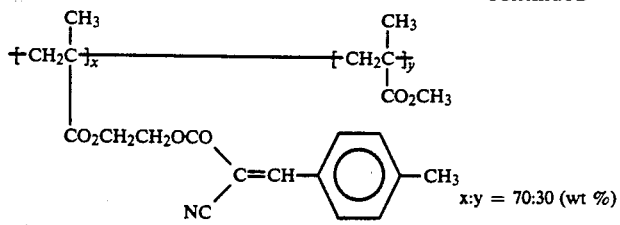
U-4
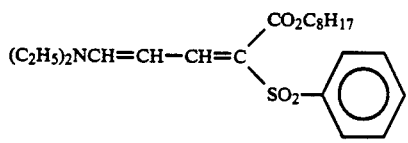
UV-5
Tricresyl phosphate        HBS-1
Di-n-butyl phthalate       HBS-2
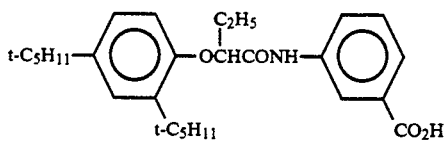
HBS-3
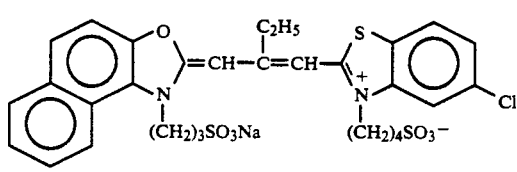
Sensitizing dye I
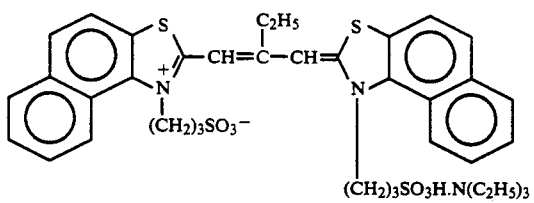
Sensitizing dye II
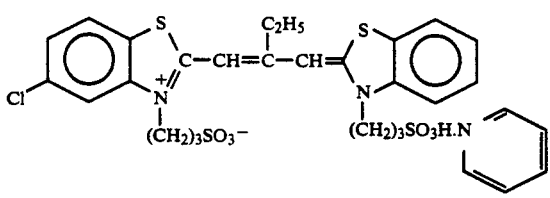
Sensitizing dye III
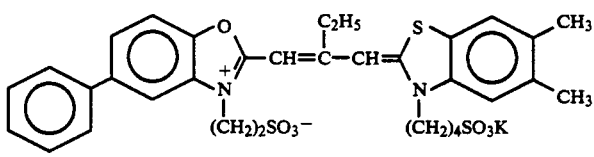
Sensitizing dye V
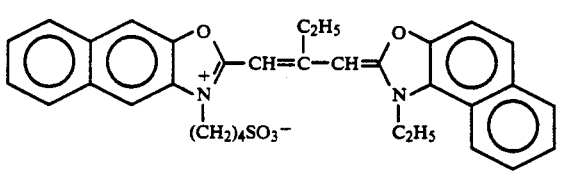
Sensitizing dye VI -continued

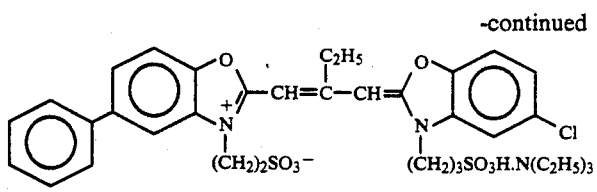

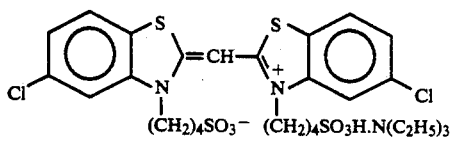

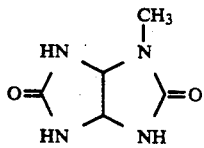

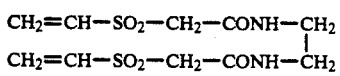

To each layer, a gelatin hardner H-1 mentioned above or surface-active agent was further added. Emulsion composition:

| | mean AgI content(%) | mean grain size (μm) | coefficient of variation (%) | dia-meter/ thickness | struc-ture |
|---|---|---|---|---|---|
| A | 4.3 | 0.45 | 27 | 1 | 3 layers |
| B | 8.7 | 0.70 | 14 | 1 | 3 layers |
| C | 10 | 0.75 | 30 | 2 | 2 layers |
| D | 16 | 1.05 | 35 | 2 | 2 layers |
| E | 10 | 1.05 | 35 | 3 | 2 layers |
| F | 4.3 | 0.25 | 28 | 1 | 3 layers |
| G | 14 | 0.75 | 25 | 2 | 2 layers |
| H | 14 | 1.30 | 25 | 3 | 2 layers |
| I | 1 | 0.07 | 15 | 1 | homo-geneous |

In this manner, the silver halide photographic material having a magnetic recording film was prepared.

EXAMPLE 2

The procedure of Example 1 was repeated except for using as a polyester film containing a ferromagnetic powder poly(ethylene terephthalate) [B] instead of poly(ethylene terephthalate) [A] to prepare a silver halide photographic material having a magnetic recording film.

EXAMPLE 3

The procedure of Example 1 was repeated except for using as a polyester film containing no ferromagnetic powder poly(ethylene terephthalate) [A] instead of poly(ethylene terephthalate) [B] to prepare a silver halide photographic material having a magnetic recording film.

EXAMPLE 4

The procedure of Example 3 was repeated except for using as a polyester film containing a ferromagnetic powder poly(ethylene terephthalate) [B] instead of poly(ethylene terephthalate) [A] to prepare a silver halide photographic material having a magnetic recording film.

Sensitizing dye VII

Sensitizing dye VIII

S-1

H-1

COMPARISON EXAMPLE 1

The procedure of Example 1 was repeated except for forming the following magnetic recording layer on the poly(ethylene terephthalate) [B] film instead of the polyester film containing a ferromagnetic powder and the poly(ethylene terephthalate) [A] to prepare a silver halide photographic material having a magnetic recording film. The components for magnetic paint indicated below were kneaded in a sand mill to give a magnetic paint. And the magnetic paint was coated over the poly(ethylene terephthalate) [B] film to prepare a composite sheet.

| | |
|---|---|
| Vinyl chloride/vinyl acetate copolymer (vinyl chloride/vinyl acetate/vinyl alcohol =89/3–5/3–6, by weight, available from Union Carbide Co., Ltd.) | 10.0 parts |
| Ferromagnetic metal (mentioned above) | 0.17 part |
| Ethyl acetate | 58.0 parts |
| Methyl ethyl ketone | 29.0 parts |

COMPARISON EXAMPLE 2

The procedure of Example 1 was repeated except for using cellulose triacetate instead of the polyester film to prepare a silver halide photographic material having a magnetic recording film. The components for magnetic paint indicated below were kneaded in a sand mill to give a dope solution (A). Separately, a dope solution (B) was prepared. These dope solutions were simultaneously casted over a casting band by means of a composite slit-die in such a manner that a dope solution (A) is located on a dope solution (B). Thus, a composite sheet consisting of a film of the a dope solution (A) containing a ferromagnetic powder having a thickness of 5 μm and a film of the a dope solution (B) having a thickness of 120 μm was prepared.

| | (A) | (B) |
|---|---|---|
| Cellulose triacetate | 10.0 parts | 10.0 parts |
| Triphenyl phosphate | 1.0 part | 2.3 parts |
| Biphenyldiphenyl phosphate | 0.6 part | 1.3 parts |

-continued

|  | (A) | (B) |
|---|---|---|
| Co-doped γ-Fe$_2$O$_3$ *fine powder* (mentioned in Example 1) | 0.18 part | — |
| Methylene chloride | 79.5 parts | 65.7 parts |
| Methanol | 3.5 parts | 2.9 parts |
| n-butanol | 5.8 parts | 4.8 parts |

COMPARISON EXAMPLE 3

The procedure of Comparison Example 1 was repeated except for using the cellulose triacetate film obtained from the above dope solution (B) instead of the poly(ethylene terephthalate) [B] film to prepare a silver halide photographic material having a magnetic recording film.

EXAMPLE 5

The procedure of Example 1 was repeated except for using disodium salt of 3,5-di(methyloxycarbonyl)-phenylphosphonic acid instead of dimethyl 5-sodiumsulfoisophthalate to prepare a silver halide photographic material having a magnetic recording film.

EXAMPLE 6

The procedure of Example 1 was repeated except for using barium ferrite fine plate powder (Hc=650 Oe) having a mean particle size of 0.6 μm instead of Co-doped γ-Fe$_2$O$_3$ fine powder (Hc=700 Oe) to prepare a silver halide photographic material having a magnetic recording film.

EXAMPLE 7

The procedure of Example 1 was repeated except for using as a polyester film containing a ferromagnetic powder the poly(ethylene terephthalate) [B] containing the following polymer [C] of 10 weight % per the poly(ethylene terephthalate) [B] instead of the poly(ethylene terephthalate) A] to prepare a silver halide photographic material having a magnetic recording film.

[Preparation of Polymer [C]]

100 weight parts of dimethyl terephthalate, 50 weight parts of diethylene glycol, 30 weight parts of dimethyl 5-sodiumsulfoisophthalate and 10 weight parts of dimethyl adipate were mixed, and 0.1 weight parts of calcium acetate and 0.03 weight parts of antimony trioxide were added thereto to conduct interesterification in a usual manner. To the resultant product was added 0.5 weight parts of trimethyl phosphate, followed by gradually raising the temperature and gradually diminishing the pressure to a final temperature of 280° C. and a final pressure of 1 mmHg or less to conduct coesterification, whereby polymer [C] was prepared.

EXAMPLE 8

The procedure of Example 1 was repeated except for using as a polyester film containing a ferromagnetic powder the poly(ethylene terephthalate) [B] containing polyethylene glycol (a mean molecular weight: 30,000) of 10 weight % per poly(ethylene terephthalate) [B] instead of poly(ethylene terephthalate) [A] to prepare a silver halide photographic material having a magnetic recording film.

EXAMPLE 9

The procedure of Example 1 was repeated except for using as a polyester film containing a ferromagnetic powder poly(ethylene terephthalate) [B] containing SiO$_2$ (mean particle size: 0.1 μm, specific surface area: 40 m$^2$/g) of 10 weight % per poly(ethylene terephthalate) [B] instead of the poly(ethylene terephthalate) [A] to prepare a silver halide photographic material having a magnetic recording film.

EXAMPLE 10

The procedure of Example 1 was repeated except for using as a polyester film containing a ferromagnetic powder poly(ethylene terephthalate) [B] containing Al$_2$O$_3$ (mean particle size: 0.08 μm, specific surface area: 30 m$^2$/g) of 10 weight % per poly(ethylene terephthalate) [B] instead of poly(ethylene terephthalate) [A] to prepare a silver halide photographic material having a magnetic recording film.

The resultant silver halide photographic materials having a magnetic recording film were subjected to development treatment and then subjected to sensitometry. The development treatment and sensitometry was conducted according to a method described in Japanese Patent Publication No. 2(1991)-44345. As a result, the materials showed excellent sensitometory characteristics as much as a usual photographic material having no magnetic recording layer.

Further, the resultant silver halide photographic materials having a magnetic recording film were measured on a magnetic output property, a bonding strength, and a tear propagation strength in the following manner.

(Magnetic output property)

Each of the obtained photographic materials (sheets) was slit to prepare a tape having a width of 35 mm. Digital signals of 1 kHz were recorded on the tape using 4-channel audio head (head gap: 4 μm, turn number: 1,000, track width: 0.4 mm) at feeding rate of 30 mm/sec. After the tape was kept for 3 days at 60° C., 70% RH, the tape was examined on an output property by repeatedly running (1,000 times) it using the above head to determine ratio of error occurrence.

(Bonding strength)

After the tape was kept for 2 days at 25° C., 70% RH, bonding strength was examined in the following manner. 7 notch lines at a interval of 5 mm were cut crosswise on a surface of the magnetic recording film to form 36 measures thereon. On the surface an adhesive-backed tape (Nitto tape available from Nitto Electric Industrial Co., Ltd.) was allowed to adhere, and then the tape was peeled rapidly in the direction at 180° to the surface. The evaluation was defined as follows.

A: peeled area is less than 10%
B: peeled area is in the range of 10 to 40%
C: peeled area is more than 60%

(Tear propagation strength)

Using a light load tear propagation test machine (Toyo Seiki Co., Ltd.), a notch of 13 mm was cut on a surface of the magnetic recording film (sample size: 51×61 mm), and both edges of the film was pulled until the notch reaches a location of 51 mm of the remaining film, to measure a value indicated by the machine on the reached time.

The results are set forth in Table 1.

TABLE 1

| | Film with magnetic powder | Film with no magnetic powder | Output | Bonding Strength | Tear Strength |
|---|---|---|---|---|---|
| Ex. 1 | PET[A] | PET[B] | 0 | A | 913 |
| Ex. 2 | PET[B] | PET[B] | 2 | A | 919 |
| Ex. 3 | PET[A] | PET[A] | 0 | A | 877 |
| Ex. 4 | PET[A] | PET[B] | 0 | A | 889 |
| Com. Ex. 1 | VC/VA-CP | PET[B] | 4 | C | 882 |
| Com. Ex. 2 | CTA | CTA | 205 | A | 187 |
| Com. Ex. 3 | VC/VA-CP | CTA | 224 | C | 183 |

REMARK:
PET[A]: Poly(ethylene terephthalate) [A]
PET[B]: Poly(ethylene terephthalate) [B]
VC/VA-CP: Vinyl chloride/vinyl acetate copolymer
CTA: Cellulose triacetate Subsequently, examples of the magnetic recording sheet are described.

EXAMPLE 11

[Preparation of Poly(ethylene terephthalate)]

100 Weight parts of dimethyl terephthalate, 70 weight parts of diethylene glycol, 10 weight parts of dimethyl 5-sodiumsulfoisophthalate and 10 weight parts of dimethyl adipate were mixed, and 0.1 weight part of calcium acetate and 0.03 weight part of antimony trioxide were added thereto to conduct interesterification in a usual manner. To the resultant product was added 0.5 weight part of trimethyl phosphate, followed by gradually raising the temperature and gradually diminishing the pressure to a final temperature of 280° C. and a final pressure of 1 mmHg or less to conduct coesterification, whereby poly(ethylene terephthalate) [A] was prepared.

Separately, poly(ethylene terephthalate) [B] was prepared in the same manner as the preparation of poly(ethylene terephthalate) [A] except for employing 20 weight parts of dimethyl terephthalate instead of 10 weight parts of dimethyl 5-sodiumsulfoisophthalate and 10 weight parts of dimethyl adipate.

30 Weight parts of Co-doped $\gamma$-Fe$_2$O$_3$ fine powder (Hc=700 Oe) having a mean particle size of 0.3 $\mu$m and a ratio of the particle size of 8, 0.2 weight part of calcium carbonate, 0.5 weight part of calcium stearate, 0.8 weight part of carbon black and 70 weight parts of the above poly(ethylene terephthalate) [A] were homogeneously kneaded by a twin-screw kneader to extrude under melting.

Separately, the poly(ethylene terephthalate) [B] was extruded under melting. The extruded product of the poly(ethylene terephthalate) [A] and the extruded product the poly(ethylene terephthalate) [B] were extruded by a coextruder from each adjusted lip gap to prepare a composite sheet. The sheet was stretched up to 3.3 times in a mechanical direction at 90° C., and stretched up to 3.0 times in a width direction at 105° C., and then was placed at 210° C. for 5 seconds, whereby a composite sheet sample consisting of the poly(ethylene terephthalate) [A] film containing a ferromagnetic powder having a thickness of 5 $\mu$m and the poly(ethylene terephthalate) [B] film having a thickness of 120 $\mu$m was prepared.

COMPARISON EXAMPLE 4

The procedure of Example 11 was repeated except for using as a polyester film containing a ferromagnetic powder the poly(ethylene terephthalate) [B] instead of the poly(ethylene terephthalate) [A] to prepare a magnetic recording sheet.

(Magnetic output property)

Each of the magnetic recording sheets obtained in Example 11 and Comparison Example 4 was slit to prepare a tape having a width of 35 mm. Digital signals of 1 kHz were recorded on the tape using 4-channel audio head (head gap: 4 $\mu$m, turn number: 1,000, track width: 0.4 mm) at feeding rate of 30 mm/sec. And the tape was reproduced using the above head to determine S/N (SN ratio).

S/N shown in the tape of Example 11, in which the polyester material of the magnetic recording film has a hydrophilic group, was higher by 3.1 dB than that of Comparison Example 4.

EXAMPLE 12

The procedure of Example 11 was repeated except for using barium ferrite fine plate powder (Hc=650 Oe) having a mean particle size of 0.6 $\mu$m instead of Co-doped $\gamma$-Fe$_2$O$_3$ fine powder (Hc=700 Oe) to prepare a magnetic recording sheet.

The obtained sheet was examined in the above manner (Example 11). S/N shown in the tape of Example 12 was higher by 3.0 dB than that of Comparison Example 4.

EXAMPLE 13

The procedure of Example 11 was repeated except for using Co-doped $\gamma$-Fe$_2$O$_3$ fine powder (Hc=800 Oe) having a mean particle size of 0.2 $\mu$m and a ratio of the particle size of 7 instead of Co-doped $\gamma$-Fe$_2$O$_3$ fine powder (Hc=700 Oe) to prepare a magnetic recording sheet.

The obtained sheet was examined in the above manner (Example 11). S/N shown in the tape of Example 13 was higher by 2.8 dB than that of Comparison Example 4.

EXAMPLE 14

The procedure of Example 11 was repeated except for using as a polyester film containing a ferromagnetic powder the poly(ethylene terephthalate) [A] instead of the poly(ethylene terephthalate) [B] to prepare a magnetic recording sheet.

The obtained sheet was examined in the above manner (Example 11) to show the same result as that of Example 11.

EXAMPLE 15

The procedure of Example 12 was repeated except for using as a polyester film containing a ferromagnetic powder the poly(ethylene terephthalate) [A] instead of the poly(ethylene terephthalate) [B] to prepare a magnetic recording sheet.

The obtained sheet was examined in the above manner (Example 11) to show the same result as that of Example 12.

EXAMPLE 16

The procedure of Example 13 was repeated except for using as a polyester film containing a ferromagnetic powder the poly(ethylene terephthalate) [A] instead of the poly(ethylene terephthalate) [B] to prepare a magnetic recording sheet.

The obtained sheet was examined in the above manner (Example 11) to show the same result as that of Example 13.

EXAMPLE 17

The procedure of Example 11 was repeated except for using disodium salt of 3,5-di(methyloxycarbonyl)-phenylphosphonic acid instead of dimethyl 5-sodium-sulfoisophthalate to prepare a magnetic recording sheet.

The obtained sheet was examined in the above manner (Example 11) to show the same result as that of Example 11.

I claim:

1. A silver halide photographic material comprising a transparent support, at least one silver halide emulsion layer, and a magnetic recording film, wherein said support and magnetic recording film are prepared by coextrusion of a polyester material containing no ferromagnetic powder and a polyester material containing a ferromagnetic powder.

2. The silver halide photographic material as claimed in claim 1, wherein at least one polyester material has a hydrophilic group in its molecular structure.

3. The silver halide photographic material as claimed in claim 2, wherein the hydrophilic group is a member selected from the group consisting of a hydroxyl group, an alkyleneoxide group and an ionic group.

4. The silver halide photographic, material as claimed in claim 1, wherein each of the polyester materials has a hydrophilic group in its molecular structure.

5. The silver halide photographic material as claimed in claim 4, wherein the hydrophilic group is a member selected from the group consisting of a hydroxyl group, an alkyleneoxide group and an ionic group.

6. The silver halide photographic material as claimed in claim 1, wherein at least one of the support and the magnetic recording film contains a hygroscopic material.

7. The silver halide photographic material as claimed in claim 6, wherein the hygroscopic material is a member selected from the group consisting of polyacrylic acid, its derivatives, polymethacrylic acid, its derivatives, polyacrylamide, its derivatives, polystyrene sulfonate, its derivatives, polyethylene oxide and its derivatives.

8. The silver halide photographic material as claimed in claim 6, wherein the hygroscopic material is selected from the group consisting of silica, alumina, calcium carbonate, magnesium carbonate, kaolin, clay, talc and titanium dioxide.

9. The silver halide photographic material as claimed in claim 1, wherein the ferromagnetic powder is a member selected from the group of ferromagnetic needle powders of ferromagnetic iron oxide, ferromagnetic iron oxide containing Co, ferromagnetic metal and chromium dioxide, and has a mean particle size of 0.04 to 3.0 $\mu$m, a ratio of long diameter to short diameter of the particle size of 3 to 15 and a content of 0.01 to 1 gram per 1 $m^2$ of the magnetic recording film.

10. The silver halide photographic material as claimed in claim 1, wherein the ferromagnetic powder is a barium ferrite plate having a mean particle size of 0.04 to 3.0 $\mu$m, a ratio of long diameter to short diameter of the particle size of 3 to 15 and a content of 0.01 to 1 gram per 1 $m^2$ of the magnetic recording film.

11. The silver halide photographic material as claimed in claim 1, wherein the ferromagnetic powder is a cubic magnetite containing Co having a mean particle size of 0.05 to 1.0 $\mu$m and a content of 0.01 to 1 gram per 1 $m^2$ of the magnetic recording film.

12. A silver halide photographic material enclosed with a cylindrical cartridge, said silver halide photographic material comprising a transparent support, at least one silver halide emulsion layer and a magnetic recording film, and said cylindrical cartridge having a spool for winding the photographic material therearound, wherein said support and magnetic recording film are prepared by coextrusion of a polyester material containing no ferromagnetic powder and a polyester material containing a ferromagnetic powder.

13. The silver halide photographic material enclosed with a cylindrical cartridge as claimed in claim 12, wherein at least one polyester material has a hydrophilic group in its molecular structure.

14. The silver halide photographic material enclosed with a cylindrical cartridge as claimed in claim 12, wherein at least one of the support and the magnetic recording film contains a hygroscopic material.

15. The silver halide photographic material enclosed with a cylindrical cartridge as claimed in claim 12, wherein the cylindrical cartridge has a film feeding means.

16. The silver halide photographic material enclosed with a cylindrical cartridge as claimed in claim 15, wherein at least one polyester material has a hydrophilic group in its molecular structure.

17. The silver halide photographic material enclosed with a cylindrical cartridge as claimed in claim 15, wherein at least one of the support and the magnetic recording film contains a hygroscopic material.

18. A magnetic recording sheet comprising a support and a magnetic recording layer, wherein said support and magnetic recording film are prepared by coextrusion of a polyester material containing no ferromagnetic powder and a polyester material containing a ferromagnetic powder, the latter polyester material having a hydrophilic group in its structure.

19. The magnetic recording sheet as claimed in claim 8, the hydrophilic group is a member selected from the group consisting of a sulfonic acid group, a group derived from sulfonic acid, a phosphoric acid group and a group derived from phosphoric acid.

20. The magnetic recording sheet as claimed in claim 18, wherein said polyester material containing no ferromagnetic powder has a hydrophilic group in its structure.

21. The magnetic recording sheet as claimed in claim 20, wherein the hydrophilic group is a member selected from group consisting of a sulfonic acid group, a group derived from sulfonic acid, a phosphoric acid group and a group derived from phosphoric acid.

22. The magnetic recording sheet as claimed in claim 18, wherein said ferromagnetic powder is a member selected from the group consisting of ferromagnetic iron oxide, ferromagnetic iron oxide containing Co, ferromagnetic metal and chromium dioxide, and has a mean particle size of 0.04 to 3.0 $\mu$m and a ratio of long diameter to short diameter of the particle size of 2 to 15.

23. The magnetic recording sheet as claimed in claim 18, wherein said ferromagnetic powder is a barium ferrite plate having a mean particle size of 0.04 to 3.0 $\mu$m.

24. The magnetic recording sheet as claimed in claim 18, wherein the ferromagnetic powder is a cubic magnetite containing Co having a mean particle size of 0.05 to 1.0 $\mu$m and a content of 0.01 to 1 gram per 1 $m^2$ of the magnetic recording film.

* * * * *